US011303329B2

(12) United States Patent
Jung et al.

(10) Patent No.: US 11,303,329 B2
(45) Date of Patent: Apr. 12, 2022

(54) DEVICE AND SYSTEM CHARACTERIZED BY MEASUREMENT, REPORT, AND CHANGE PROCEDURE BY TERMINAL FOR CHANGING TRANSMISSION/RECEPTION POINT, AND BASE STATION PROCEDURE FOR SUPPORTING SAME

(71) Applicant: Samsung Electronics Co., Ltd., Suwon-si (KR)

(72) Inventors: Byounghoon Jung, Suwon-si (KR); Sunheui Ryoo, Yongin-si (KR); Jungmin Moon, Suwon-si (KR); Seunghoon Park, Seoul (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 16/321,612

(22) PCT Filed: Aug. 11, 2017

(86) PCT No.: PCT/KR2017/008757
§ 371 (c)(1),
(2) Date: Jan. 29, 2019

(87) PCT Pub. No.: WO2018/030845
PCT Pub. Date: Feb. 15, 2018

(65) Prior Publication Data
US 2021/0288696 A1 Sep. 16, 2021

Related U.S. Application Data

(60) Provisional application No. 62/373,599, filed on Aug. 11, 2016.

(51) Int. Cl.
H04W 24/10 (2009.01)
H04B 7/0417 (2017.01)
(Continued)

(52) U.S. Cl.
CPC ........... *H04B 7/0421* (2013.01); *H04B 7/024* (2013.01); *H04B 7/0626* (2013.01);
(Continued)

(58) Field of Classification Search
CPC ... H04B 7/02; H04B 7/04; H04B 7/06; H04B 7/08; H04B 7/024; H04B 7/0421;
(Continued)

(56) References Cited

U.S. PATENT DOCUMENTS 9,332,474 B2   5/2016  Sun et al.
2010/0034173 A1* 2/2010  Luo ....................... H04W 36/30
                                                      370/332
(Continued)

FOREIGN PATENT DOCUMENTS

WO   2014-075532 A1   5/2014
WO   2016/070660 A1   5/2016

OTHER PUBLICATIONS

ZTE; 'WF on aperiodic CSI for NR'; 3GPP TSG RAN WG1 #85; R1-165590; Nanjing, China.
(Continued)

*Primary Examiner* — Shawkat M Ali
(74) *Attorney, Agent, or Firm* — Jefferson IP Law, LLP

(57) ABSTRACT

The disclosure relates to a communication technique for convergence of an IoT technology and a 5G communication system for supporting a higher data transmission rate beyond a 4G system, and a system therefor. The disclosure can be applied to an intelligent service (for example, a smart home, a smart building, a smart city, a smart cart or connected car, health care, digital education, retail business, security and safety-related service, etc.) on the basis of a 5G communication technology and an IoT-related technology. The disclosure defines a mobility method for a terminal residing in
(Continued)

a system in which transmission/reception points (TPRs), supporting solely some protocols among entire access stratum protocols comprising PHY, MAC, RLC, PDCP, and RRC, coexist in a wireless communication system. Specifically, the disclosure defines a method for dynamically changing, depending on determination by a base station, a beam and a transmission/reception point to be used for transmitting information to or receiving information from a terminal through a method in which a system using multiple beams notifies, in advance, of a measurement reference signal transmitted using transmission/reception points of different networks, to allow a terminal to select a required reception beam from a corresponding resource and measure beam information of each transmission/reception point, or a terminal transmits measured information as feedback in which each transmission/reception point is specified. Accordingly, the disclosure can provide a criterion of rapid and highly precise determination for changing a beam and a transmission/reception point and thus prevent a terminal from needlessly measuring and reporting, so as to achieve an effect of reduction in the power consumption of the terminal and reduction of delay in change of a transmission/reception point.

16 Claims, 30 Drawing Sheets

(51) Int. Cl.
　　*H04B 7/024*　　(2017.01)
　　*H04B 7/06*　　(2006.01)
　　*H04W 74/08*　　(2009.01)
　　*H04W 88/08*　　(2009.01)
(52) U.S. Cl.
　　CPC .......... *H04B 7/0695* (2013.01); *H04W 24/10* (2013.01); *H04W 74/0833* (2013.01); *H04W 88/08* (2013.01)

(58) Field of Classification Search
　　CPC ...... H04B 7/0626; H04B 7/0695; H04B 7/14; H04B 17/02; H04L 5/00; H04L 5/02; H04W 4/00; H04W 24/10; H04W 36/02; H04W 36/30; H04W 52/02; H04W 64/00; H04W 72/04; H04W 72/08; H04W 72/12; H04W 72/042; H04W 74/08; H04W 74/0833; H04W 88/08
　　USPC ....... 370/241, 252, 280, 311, 328, 329, 330, 370/332; 375/219, 260, 267, 295, 316; 455/422.1, 438, 444, 509
　　See application file for complete search history.

(56) References Cited

U.S. PATENT DOCUMENTS

| | | | |
|---|---|---|---|
| 2011/0306347 A1* | 12/2011 | Choi ..................... | H04W 36/04 455/438 |
| 2012/0028676 A1* | 2/2012 | He .................... | H04W 36/0085 455/525 |
| 2013/0083713 A1* | 4/2013 | Johansson ......... | H04W 52/0225 370/311 |
| 2013/0229992 A1 | 9/2013 | Yue et al. | |
| 2013/0303167 A1 | 11/2013 | Zhu et al. | |
| 2015/0304994 A1* | 10/2015 | Kim ................... | H04W 72/042 370/280 |
| 2016/0197711 A1 | 7/2016 | Zhang et al. | |
| 2016/0285603 A1 | 9/2016 | Gu et al. | |

OTHER PUBLICATIONS

SAMSUNG; 'Intra-5G Mobility related requirements'; 3GPP TSG RAN WG2 Meeting #94; R2-163364; Nanjing, China.
Intel Corporation, R2-162709, Beam support in NR, 3GPP TSG RAN WG2 #93bis, Apr. 2, 2016.
Zte et al., R1-165832, WF on aperiodic CSI for NR, 3GPP TSG RAN WG1 #85, May 30, 20106.
Korean Office Action dated Aug. 31, 2018, issued in Korean Application No. 10-2017-0102185.

* cited by examiner

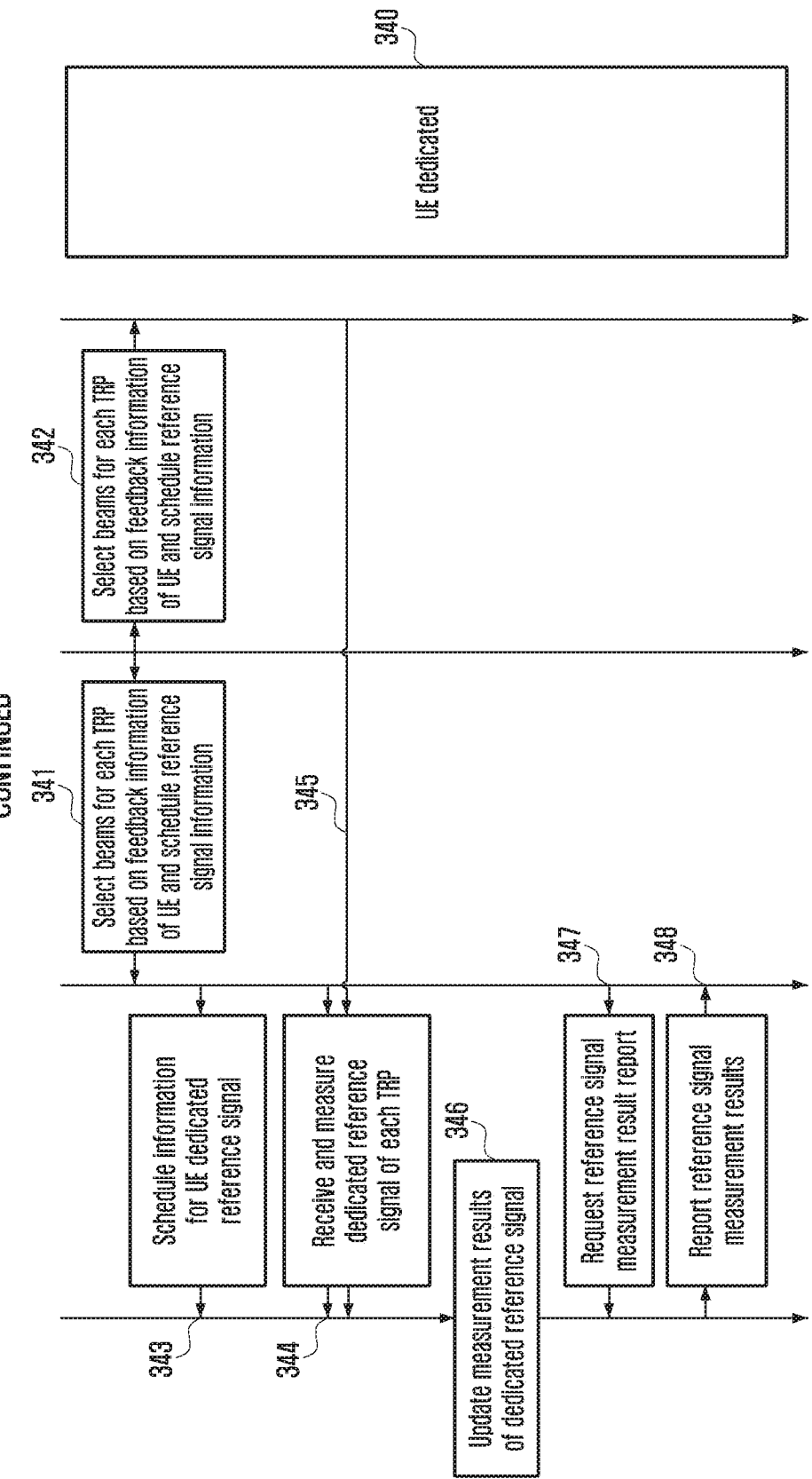

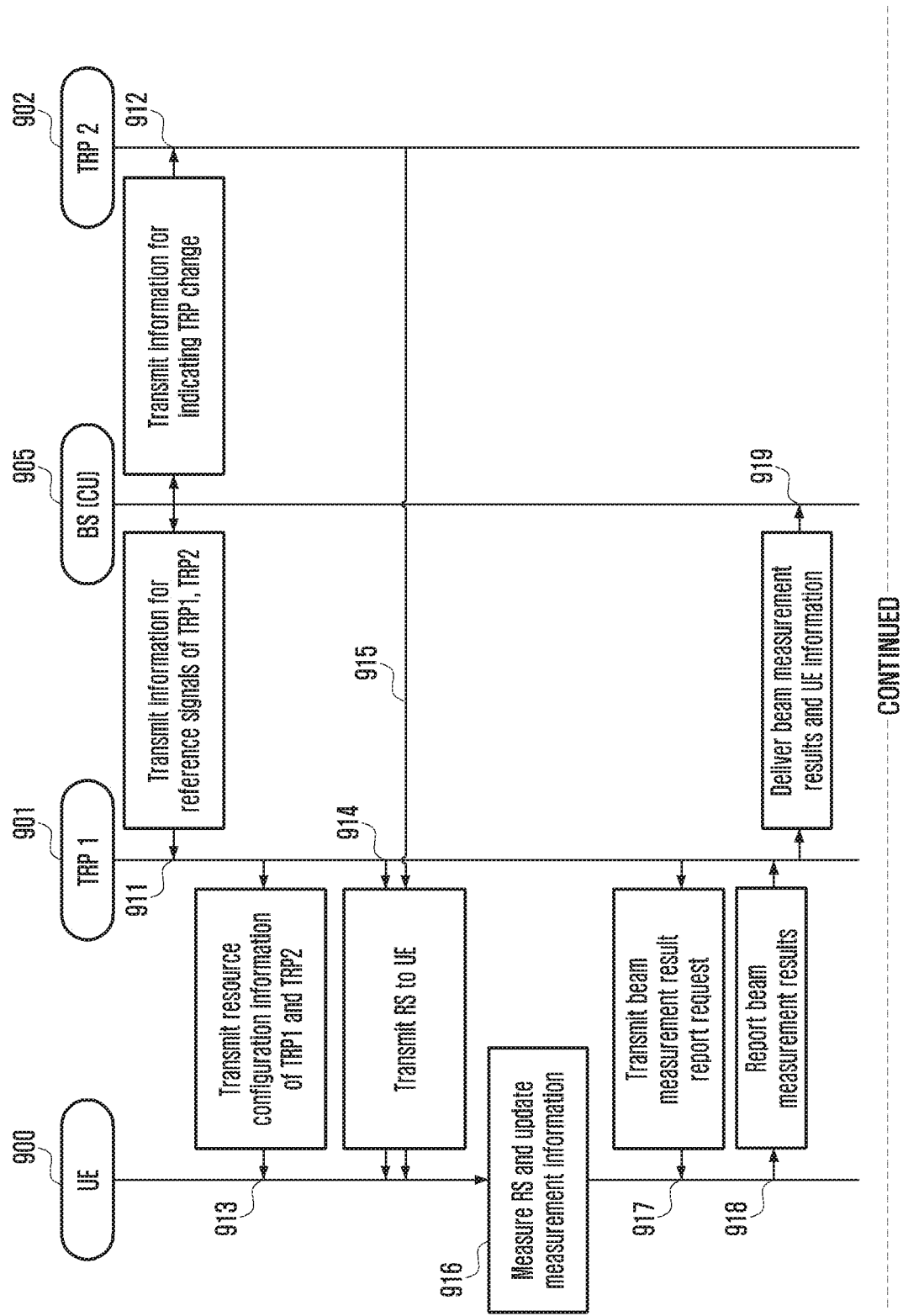

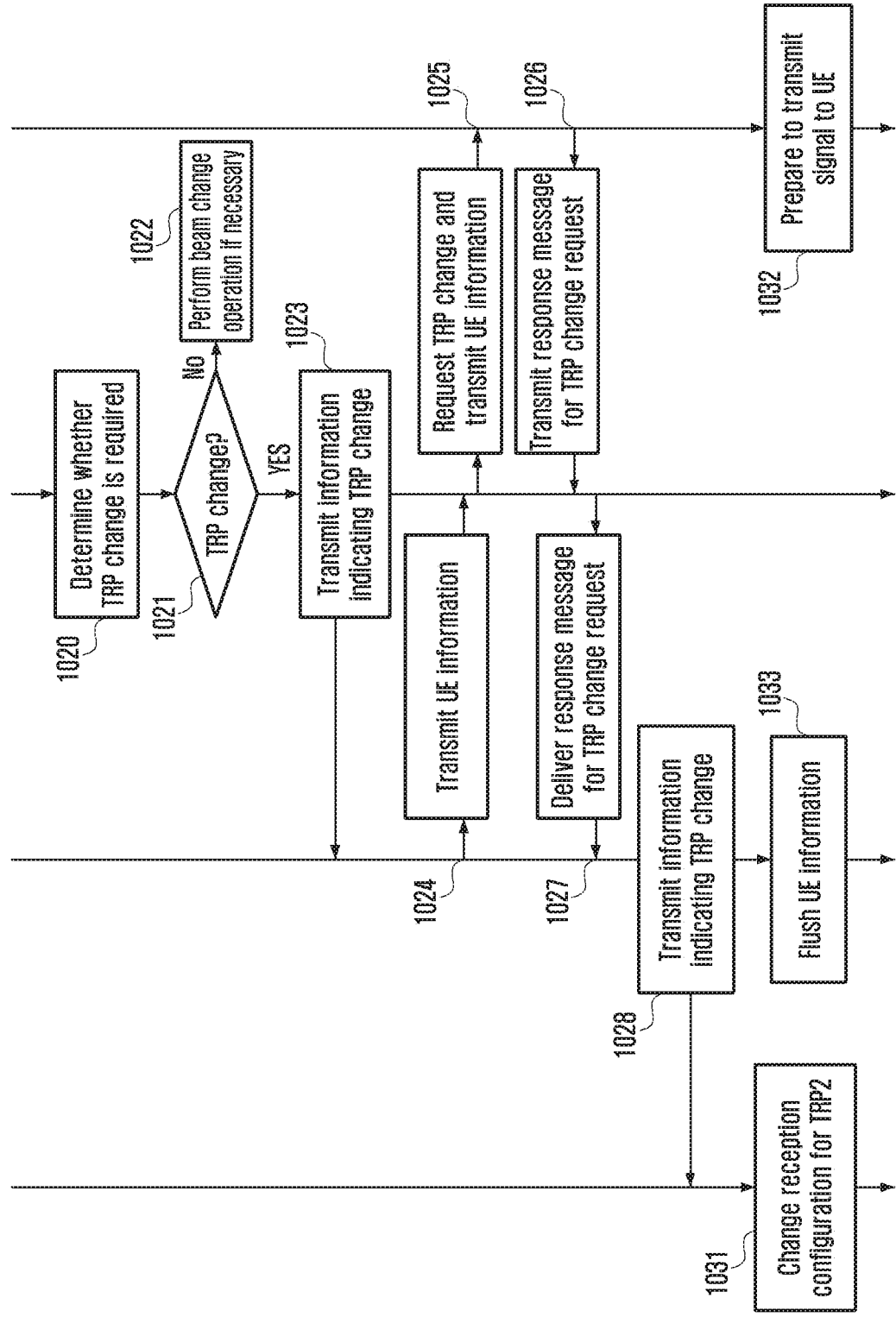

DEVICE AND SYSTEM CHARACTERIZED BY MEASUREMENT, REPORT, AND CHANGE PROCEDURE BY TERMINAL FOR CHANGING TRANSMISSION/RECEPTION POINT, AND BASE STATION PROCEDURE FOR SUPPORTING SAME

TECHNICAL FIELD

The disclosure relates to a next-generation wireless communication system. More specifically, the disclosure relates to a measurement, report, and change procedure of a terminal for a system including one or more transmission and reception points, a method of transmitting a measurement reference signal for each transmission and reception point and a method of collecting reports by a base station for the measurement, report, and change procedure, and a method, procedure and system for changing a transmission and reception point of each terminal.

BACKGROUND ART

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G network communication system or a post LTE system. In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beamforming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

With the advent of smartphones, the amount of user data increases geometrically. The need for such data usage is further increasing. This means that a high bandwidth is necessary. To this end, a high frequency needs to be used. However, as a high frequency is used, a signal attenuation degree for each distance rises. That is, if a center frequency of 30 GHz or more is used, a coverage reduction of a base station attributable to signal attenuation is inevitable. Furthermore, there are problems in that many beams need to be used due to the coverage reduction and latency attributable to the use of many beams is increased.

In a wireless communication system, a structure is taken into consideration in which one base station including multiple transmission and reception points capable of transmission and reception supports a wide physical area in order to improve latency attributable to a frequent exchange of terminal information and for efficient resource utilization. Such a system has been researched in various ways in a conventional technology and has been implemented.

Representatively, the following systems may be taken as the existing technologies:

A distributed antenna system (DAS) in which different transmission and reception points under one base station are simply implemented as physical antennas and transmit or receive the same signal, A remote radio head (RRH) system in which different transmission and reception points under one base station are implemented as a structure including an antenna and a simple RF stage and can transmit or receive different signals, Furthermore, a coordinated multi-point transmission/reception (CoMP) system in which different transmission and reception points under one or different base stations transmit and receive the same information to and from one user at the same time through synchronization or the other transmission and reception point is silent while one transmission and reception point transmits and receives information.

In such a background, a measurement, report and change method of a terminal and an operation method of a base station supporting the same, for a transmission and reception point change are necessary.

Technical Problem

An embodiment of the disclosure proposes a method for a terminal to measure a reference signal for the selection of a beam and transmission and reception point, a method for the terminal to feed measured information back, and a method for the terminal to changing a beam and transmission and reception point in an environment in which transmission and reception points having different protocol structures are present in the same base station maintaining an RRC connected state with the terminal, and proposes a method for the base station to allocate a terminal-unique beam and transmission and reception point reference signal resource, a method for the base station to share allocated resource information with the terminal, a resource allocation and signaling method for receiving measured information through feedback, and a method for the base station to change a beam and transmission and reception point in a system configured with the base station and the transmission and reception points for the methods.

Furthermore, synchronization signals transmitted at a transmission point being used by a terminal as one reception beam and a transmission point not being used by the terminal as one reception beam cannot be received at the same time in a beamforming environment. In an embodiment of the disclosure, in order to solve the problem, there may be a method for a terminal to measure an adjacent transmission and reception point transmission reference signal while turning a dumb reception beam. In such a method, however, time is taken long, and a transmission and reception point maximum measurement time is very long, that is, the "number of transmission and reception points×the number of beams within transmission and reception point× the number of terminal beams." There is proposed a method of efficiently measuring a transmission reference signal corresponding to only the "number of transmission and reception points×the number of beams within a transmission and reception point" using an effective terminal reception beam at the reference signal transmission times of different transmission and reception points based on information transmitted by a base station.

Solution to Problem

In accordance with an embodiment of the disclosure, an operation method of a terminal may provide a method, including receiving resource configuration information, including reference signal configuration information of a first transmission and reception point (TRP) and reference signal configuration information of a second TRP, from the first TRP; measuring a reference signal corresponding to the first TRP and a reference signal corresponding to the second TRP based on the resource configuration information; reporting the measurement information on the reference signal corresponding to the first TRP and the reference signal corresponding to the second TRP to the first TRP; receiving TRP change indication information from the first TRP; and changing a configuration for the second TRP based on the TRP change indication information.

In accordance with an embodiment of the disclosure, a terminal may provide a terminal, including a transceiver configured to transmit and receive signals and a controller configured to control to receive resource configuration information, including reference signal configuration information of a first transmission and reception point (TRP) and reference signal configuration information of a second TRP, from the first TRP, to measure a reference signal corresponding to the first TRP and a reference signal corresponding to the second TRP based on the resource configuration information, report the measurement information on the reference signal corresponding to the first TRP and the reference signal corresponding to the second TRP to the first TRP, to receive TRP change indication information from the first TRP, and to change a configuration for the second TRP based on the TRP change indication information.

In accordance with an embodiment of the disclosure, an operation method of a base station may provide a method, including transmitting resource configuration information, including reference signal configuration information of a first transmission and reception point (TRP) and reference signal configuration information of a second TRP, to a terminal through the first TRP; transmitting a reference signal corresponding to the first TRP and a reference signal corresponding to the second TRP based on the resource configuration information; receiving measurement information on the reference signal corresponding to the first TRP and the reference signal corresponding to the second TRP from the terminal; determining a TRP change for the terminal based on the measurement information; transmitting TRP change indication information to the terminal through the first TRP; and changing a configuration of the second TRP for the terminal in accordance with the TRP change indication information.

Advantageous Effects

In accordance with an embodiment of the disclosure, there can be provided a measurement, report, and change procedure of a terminal for a system including one or more transmission and reception points, a method for a base station to transmit a measurement reference signal and a method for a base station to collect reports for each transmission and reception point for the measurement, report, and change procedure, and a method, procedure and system for changing a transmission and reception point of each terminal.

MODE FOR THE INVENTION

Figure 1:
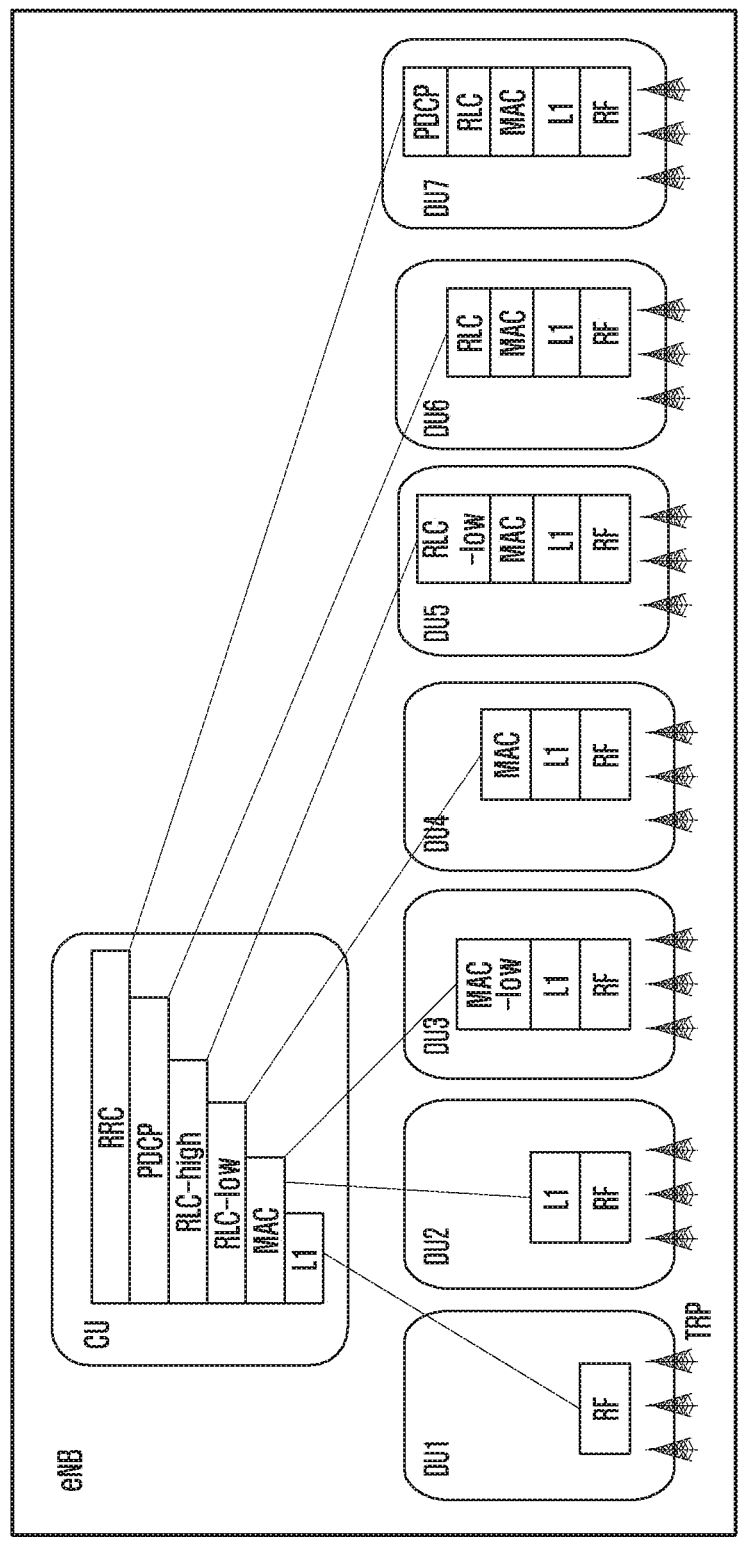
FIG. 1 is a diagram showing a TRP protocol structure according to an embodiment of the disclosure.

Hereinafter, preferred embodiments of the disclosure are described in detail with reference to the accompanying drawings. It is to be noted that the same reference numbers are used throughout the drawings to refer to the same elements. Furthermore, a detailed description of known functions or constructions that may make the gist of the disclosure vague is omitted.

In this specification, in describing the embodiments, a description of contents that are well known in the art to which the disclosure pertains and not directly related to the disclosure is omitted in order to make the gist of the disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s).

These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

In an embodiment of the disclosure, a base station (BS) is a main agent communicating with a terminal, and may be referred to as a "BS, base transceiver station (BTS), nodeB (NB), eNodeB (eNB), gNB, an access point (AP), etc. In an embodiment of the disclosure, the term called a base station or eNB is chiefly used, but is not limited thereto. The base station may be used as a gNB of a 5G NR system.

A terminal is a main agent communicating with a base station, and may be referred to as a "user equipment (UE), device, mobile station (MS), mobile equipment (ME), a terminal, etc.

In an embodiment of the disclosure, a transmission and reception point may refer to a transmission and reception point (TRP).

FIG. 1 is a diagram showing a TRP protocol structure according to an embodiment of the disclosure.

Referring to FIG. 1, a distributed unit structure configured with multiple transmission and reception points taken into consideration in an embodiment of the disclosure takes various candidates into consideration, and may include a centralized unit and a distributed unit. The centralized unit and the distributed unit may include an RF stage, a physical layer (L1 or PHY), and a higher layer (MAC stage, RLC stage, PDCP stage, and RRC stage). For example, referring to a combination of a CU and a DU1, the RRC, PDCP, RLC, MAC, and L1 layer are present in the CU, and only the RF stage is included in the DU. A combination of the CU and a DU6 is a case where the RRC, PDCP layer are present in the CU and the RLC, MAC, L1 layer and RF stage are present in the DU6. In an embodiment of the disclosure, various protocol stacks of various CUs and DUs illustrated in FIG. 1 may be applied.

In an embodiment of the disclosure, a base station may be a concept including a CU and at least one DU. Furthermore, the base station may be a concept, including a CU, at least one DU, and at least one TRP. The TRP may correspond to the antenna of the base station. A different TRP may correspond to a different antenna of the base station. The TRP may correspond to at least one of the resource set, NR-SS resource set, beam set, or antenna configuration set of a channel state information-reference signal (CSI-RS). For example, if TRPs are different, CSI-RS resource sets, NR-SS resource sets, beam sets, and antenna configuration sets may be different. A TRP may manage a plurality of beams, and a plurality of beams managed by one TRP may be defined as a beam set. What a UE transmits a signal to a TRP may be construed as being what the UE transmits a signal to a base station connected to the TRP. What a UE receives a signal from a TRP may be construed as being what the UE receives a signal from a base station connected to the TRP. If a base station is construed as including a TRP, the transmission and/or reception of a signal, information, message between the base station and a TRP may be understood as being an internal operation of the base station.

Figure 2:
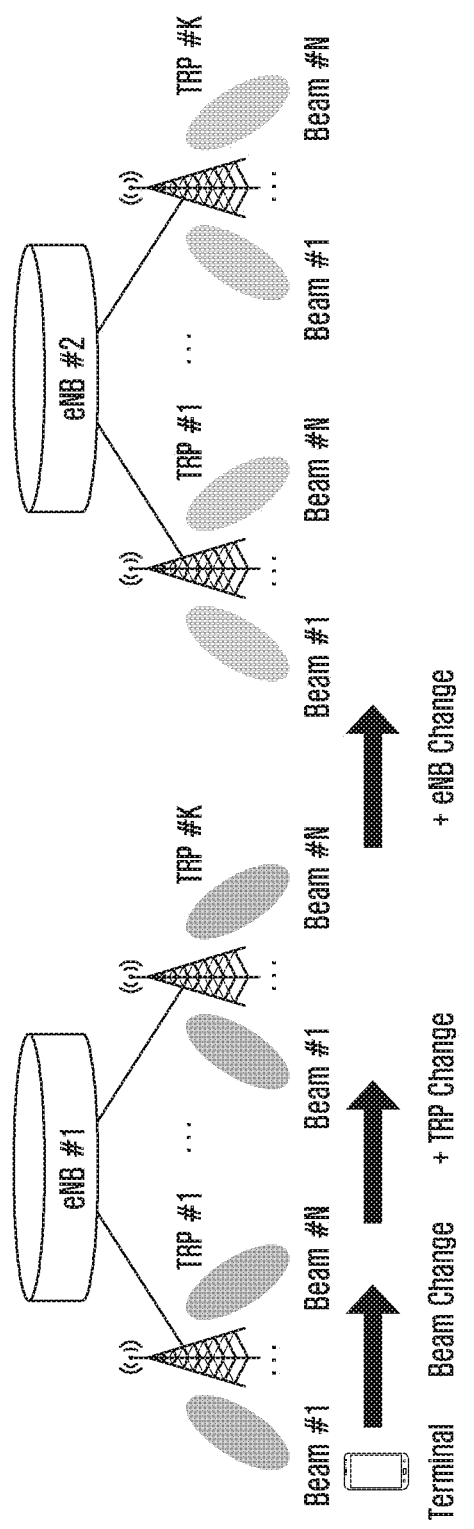
FIG. 2 is a diagram showing an environment including a multi-TRP and a multi-beam according to an embodiment of the disclosure.

FIG. 2 is a diagram showing an environment including a multi-TRP and a multi-beam according to an embodiment of the disclosure. Referring to FIG. 2, the environment including a multi-beam may include an eNB #1, an eNB #2, and a terminal. The eNB #1 may include a plurality of TRPs TRP #1 to the TRP #k. The eNB #2 may include a plurality of TRPs TRP #1 to the TRP #k. Each TRP may operate a plurality of beams. For example, each TRP may operate a beam #1 to a beam #n. The n value may be different depending on the TRP.

In FIG. 2, it is assumed that the terminal moves while being served by the Beam #1 of the TRP #1 of the eNB #1. As the eNB #1 moves, the beam of the TRP #1 for the terminal may be changed. When the terminal is out of coverage of the TRP #1 while moving by changing the serving beam of the TRP #1, a TRP change to another TRP (e.g., TRP #K) may occur. When the terminal moves from the TRP #K, a beam change may occur. When the terminal is out of coverage of the eNB #1, a serving eNB may be changed to the eNB #2. Likewise, when the terminal moves from the serving eNB #2, a beam change and a TRP change may occur.

A transmission and reception point taken into consideration in an embodiment of the disclosure may be a structure present at a location physically separated from any CU and another transmission and reception point having one of the protocol structures of FIG. 1. A terminal may perform wireless communication based on the same terminal ID (e.g., C-RNTI) as the CU using such different multiple transmission and reception points.

In this case, the corresponding terminal may communicate with the transmission and reception points or the CU using any ID (e.g., Cell ID) owned by a base station including all the multiple transmission and reception points or may communicate with the TRPs and the CU using a transmission and reception point ID (e.g., TRP ID) that is uniquely allocated and shared with the terminal or may communicate with the TRPs or the CU to which a corresponding protocol belongs using an ID (e.g., MAC ID, RLC ID, TCP ID, IP, . . . ) included in a protocol within each transmission and reception point.

In an embodiment of the disclosure, the following various methods are described in order to support a system in which multiple TRPs are managed. Each of the methods may be independently performed and a method of combining a plurality of methods may be performed.

A method for a system to explicitly (additionally) transmit a unique TRP ID different from a Cell ID to a terminal A method for a system to share an implicit rule by which terminals can distinguish between TRPs A method for a base station within a system to transmit a measurement reference signals using multiple TRPs A method for a terminal to receive the measured reference signals of multiple TRPs A method for a terminal to feed measurement information from multiple TRPs back to a base station to which the terminal belongs A method for a base station and terminal within a system to change a TRP <Method of Explicitly Transmitting Unique TRP ID to UE>

1. a method of transmitting a TRP ID through a synchronization signal

A. a method of adding an additional TRP-SS—new synchronization signal for each TRP : the existing synchronization signal (PSS, SSS, for Cell ID)+a new synchronization signal (new SS for a TRP ID)

a-1. Can identify a TRP as a new synchronization signal a-2. Define a TRP ID as a new SS having a sequence identifier and transmit it. Reference is made to the following contents for a method of defining a new SS.

New SS definition

A sequence d(0), . . . , d(K) used by a UE to obtain an extended synchronization signal is a length-K Zadoff-chu (ZC) sequence and is defined as follows.

$$d(n) = e^{-jM \lceil \frac{n(n+1)}{K} \rceil},$$

n=0, 1, . . . , K−1

In this case, K is a maximum value of the sequence, and a TRP (or CSI-RS resource set, NR-SS resource set, beam set) number (e.g., 63) and M (e.g., 23) within each base station are root indices.

A sequence used to obtain an extended synchronization signal that may be obtained within an OFDM symbol l is defined as a d(n)cyclic shift and is as follows:

In this case, when l=0, . . . , $2 \cdot N_{symb}^{DL}-1$, a cyclic shift value is defined in Table 1-A.

TABLE 1-A

| Cyclic shifts for the extended synchronization signal | |
|---|---|
| I | Cyclic shift $\Delta_r$ |
| 0 | 0 |
| 1 | 7 |
| 9 | 14 |
| 3 | 18 |
| 4 | 21 |
| 5 | 25 |

TABLE 1-A-continued

Cyclic shifts for the extended synchronization signal

| I   | Cyclic shift $\Delta_t$ |
|-----|-------------------------|
| 6   | 32                      |
| 7   | 34                      |
| 8   | 38                      |
| 9   | 41                      |
| 10  | 45                      |
| 11  | 52                      |
| ... | ...                     |
| K/4 | K−2                     |

A sequence used to scramble an extended synchronization signal in a i∈{0, 25} subframe is defined as follows:

$$r_{1(n)} = \frac{1}{\sqrt{2}}(1 - 2 \cdot c(2n)) + j\frac{1}{\sqrt{2}}(1 - 2 \cdot (2n+1)),$$

$$n = 0, 1, \ldots, K-1$$

In this case, the pseudo-random sequence c(m) is defined as follows:

The pseudo-random sequence is defined as a length-31 Gold sequence. When n=0, 1, . . . , K−1, an output sequence c(n), that is, a length $M_{PN}$, is defined as follows:

$$c(n) = (x_1(n+N_c) + x_2(n+N_c)) \bmod 2$$

$$x_1(n+(K-1)/2) = x_1(n+3) + x_1(n)) \bmod 2$$

$$x_1(n+(K-1)/2) = x_2(n+3) + x_2(n+1) + x_2(n)) \bmod 2$$

In this case, Nc=1600, and the first m-sequence is initialized using $x_1(0)=1$, $x_1(n)=0$, n=1, 2, . . . , ((K−1)/2−1). The second m-sequence is initialized as $c_{init}=\Sigma_{i=0}^{(K-1)/2-1} x_2(i) \cdot 2^i$. In this case, the parameter value is determined depending on use of the sequence.

In the i-th subframe, a pseudo-random sequence generator needs to be initialized using $c_{init}=2^{10} \cdot (i+1) \cdot (2 \cdot N_{ID}^{TRP}+1)=2 \cdot N_{ID}^{TRP}+1$.

A sequence $d^l(n)$ used in the extended synchronization signal is defined as follows.

$$d^l(n) = r_1(n) \cdot d^l(n), n=0, \ldots, K-1$$

B. New SS only—method of transmitting only an SS for synchronization for each TRP without SS including the existing Cell ID : SSs for a TRP ID only C. Modified PSS/SSS—method of modifying the existing SS and including a TRP ID : Method of transmitting a TRP ID in a PSS and SSS, that is, the existing synchronization signals in addition to a cell ID (PSS/SSS carry both Cell ID and the TRP ID)

c-1. Embodiment: A PSS is the same as that of LTE, and a scheme for modifying an SSS as follows.

$n_{ID}^{(2)} \in \{0, 1, 2\}$ is a physical layer identifier (ID) and may be used in a cell and TRP (or CSI-RS resource set, NR-SS resource set, beam set). A sequence d(0), . . . , d(61) used for a second synchronization signal has a form of interleaved concatenation produced using two length-31 binary sequences. The concatenated sequence is a scrambled sequence given by the first synchronization signal. The second synchronization signal may be transmitted through the following port. p=300, . . . , 313.

The second synchronization signal defined as a combination of the two length-31 sequences may be differently defined as follows for each subframe:

$$d(2n) = \begin{cases} s_0^{(m_0)}(n)c_0(n) & \text{in subframe 0} \\ s_1^{(m_1)}(n)c_0(n) & \text{in subframe 25} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 25} \end{cases}$$

In this case, 0≤n≤30. $S^{m_0}$ and $S^{m_1}$ denote a physical layer cell ID group $N_{ID}^{Cell(1)}$ and a physical layer TRP (or CSI-RS resource set, NR-SS resource set, beam set) ID group $N_{ID}^{TRP(1)}$, respectively.

2. Method of inclusion and transmission in reference signal

A. Method of using a unique sequence for a TRP (unique sequences for TRPs)

a-1. Method of allocating a unique sequence for each TRP

Method 1) divide and use the existing Cell ID space

A reference signal sequence η(m) is defined as follows:

$$\eta(m) = \frac{1}{\sqrt{2}}(1 - 2 \cdot c(2m)) + j\frac{1}{\sqrt{2}}(1 - 2 \cdot (2m+1)),$$

m=0, 1, . . . , $8 \cdot (N_{RB}^{maxDL}-18)-1$

In this case, l=0, 1, . . . , 13 is an OFDM symbol number. The pseudo-random sequence c(i) is defined above, and the pseudo-random generator may be initialized using the following.

1) $c_{init}=2^{10} \cdot (7 \cdot (n_2+1)+l'+1) \cdot (2 \cdot N_{ID}^{cell} \cdot N_{ID}^{TRP}+1) + 2 \cdot N_{ID}^{cell} \cdot N_{ID}^{TRP}+1$ 2) $c_{init}=2^{10} \cdot (7 \cdot (n_2+1)+l'+1) \cdot (2 \cdot N_{ID}^{cell} \cdot 2 \cdot N_{ID}^{TRP}+1) + 2 \cdot N_{ID}^{cell} \cdot 2 \cdot N_{ID}^{TRP}+1$ 3) $c_{init}=2^{10} \cdot (7 \cdot (n_2+1)+l'+1) \cdot (2 \cdot K+1)+2 \cdot K+1,$ $N_{ID}^{cell}=(K) \bmod (N_{ID}^{cellmax}/2), N_{ID}^{TRP}=(\lfloor K/(N_{ID}^{cellmax}/2) \rfloor + N_{ID}^{cell}+1) \bmod (N_{ID}^{cellmax}/2)$ 4) Or when $$n_s = \left\lfloor \frac{l}{7} \right\rfloor$$

and l'=l mod 7, any type of unique initialization code produced using different distinguishable $N_{ID}^{cell}$ and $N_{ID}^{TRP}$ at the early stage of an OFDM symbol Method 2) New sequence design—unique sequence design for each cell, each TRP including a $N_{ID}^{cell}$ and $N_{ID}^{TRP}$ B. Method of using a different resource for each TRP (different resources for TRPs)

b-1. Allocated a different frequency (carrier, subcarrier, channel, a bandwidth, etc.) to a different TRP b-2. Allocate a different time (slot, symbol, subframe, radio frame) to a different TRP b-3. Allocate a radio resource (radio resource block), represented as a different frequency and time, to a different TRP C. Different resources & sequences for TRPs c-1. Method of mixing different frequency/time/sequences and distinguishing between TRPs 3. Method of inclusion and transmission in broadcasting information Share information for distinguishing between TRPs using broadcast information, such as a master information block (MIB), a broadcast channel (BCH), a system information block (SIB) 1 or 2 (BCH), a dedicated SIB.

<Method of Sharing an Implicit TRP Classification Method with a UE>

A base station may deliver a method by which a UE can distinguish between TRPs to the UE.

| 1. Table in which a Beam ID and a TRP ID are mapped | |
| --- | --- |
| Beam ID | TRP ID |
| 0 | 1 |
| 1 | 2 |
| ... | ... |
| N | K |

2. Method of calculating a TRP ID as a Beam ID

A. MSB K bits of Beam ID=TRP ID

B. (Beam ID)mod(K)=TRP ID

C. Floor(Beam ID/K)=TRP ID

D. ceiling(Beam ID/K)=TRP ID

E. Indication that the order of Beam RS transmission=TRP ID

3. Method of classification based on an RS resource ID

A. Provide a UE with an associative relation between a sync signal resource ID, a CSI-RS resource ID and a TRP in a table/rule form B. Provide a UE with an associative relation between a sync signal beam ID, a CSI-RS beam ID and a TRP in a table/rule form 4. Method of classification based on an RS resource set A. A UE considers configured/scheduled RS resource sets as a different measurement subject and measure/change it.

B. A network may manage TRPs by differently allocating RS resource sets for each TRP.

C. A CSI-RS resource set, an NR-SS synch burst/burst set may be used.

The information may be provided to a UE in the following form.

1. Method of inclusion and transmission in broadcast information May be transmitted using an MIB (BCH), an SIB 1 or 2 (BCH), and/or a Dedicated SIB.

2. Inclusion and transmission in dedicated (unicast) information

New MAC-CE use transmission, may be included in an RRC message (RRC Connection reconfiguration, RRC Connection Setup) as a new IE and transmitted, and may be transmitted as a PHY message and/or may be transmitted as a MAC message.

Figure 7A:
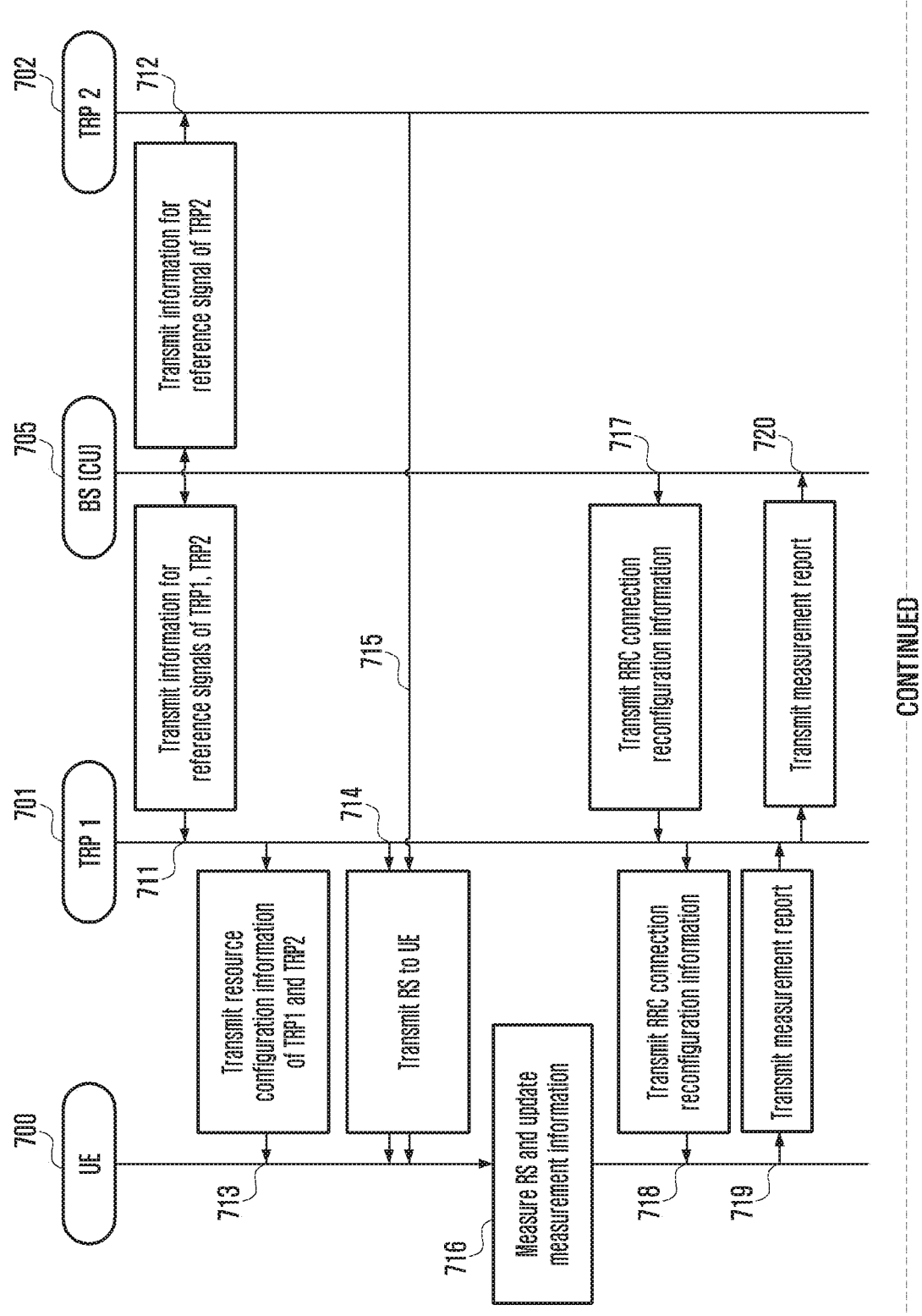
FIG. 7 is a diagram showing a TRP change method of a base station through the RS measurement of a terminal according to an embodiment of the disclosure.

If the implicit TRP classification method is used, a base station includes a rule using the implicit classification method, instead of including a TRP ID, when it transmits resource configuration information of different TRPs or configures a resource based on an already set rule. This may be applied to step 713 of FIG. 7A.

Furthermore, a UE may use a rule using the implicit classification method, included in a corresponding message when it distinguishes between different TRPs within received resource configuration information, or may distinguish between resources allocated by different TRPs based on an already set rule. This may be applied to step 716 of FIG. 7A.

<Method for a Base Station to Transmit a TRP-Measured Reference Signal (RS)>

[Mobility Using an RS Transmitted by Base Station Allocation at a UE Unique Period/Time]

1. A TRP (or TRP-higher eNB) determines that each TRP transmits RSs for different Tx beams at the same time/frequency resource, and may notify a UE of corresponding scheduling information.

A. A known method uses a new IE within a PDCCH unicast, PDCCH sweeping broadcast/multicast, RRC connection reconfigure, B. An RS may be determined as follows based on received feedback/report information with respect to one or multiple UEs b-1. In the case of one UE target, allocation is performed in order of the best beam of beams reported to have reception performance (RSRP, RSRQ, CQI, SNR, SINR, RSSI) of a given threshold or more, which may be received by the corresponding UE b.2. Transmit information to a higher eNB through front haul with respect to an adjacent TRP transmission beam or directly transmit the information to a corresponding TRP through an interface (X2, S1, . . . .)

b.3. Or determine to select given beams b.4 Or Allocate adjacent beams (from the nearest beams) of the best beam for each TRP.

C. When a UE performs reception using each known TRP measurement value, the UE selects a better UE beam and measures a scheduling resource using the corresponding beam.

2. A TRP (or TRP-higher eNB) may determine that each TRP transmits an RS for a different TRP at a different time (or frequency) resource and notify a UE of corresponding scheduling information.

<Method for a UE to Measure a TRP>

Figure 3A:
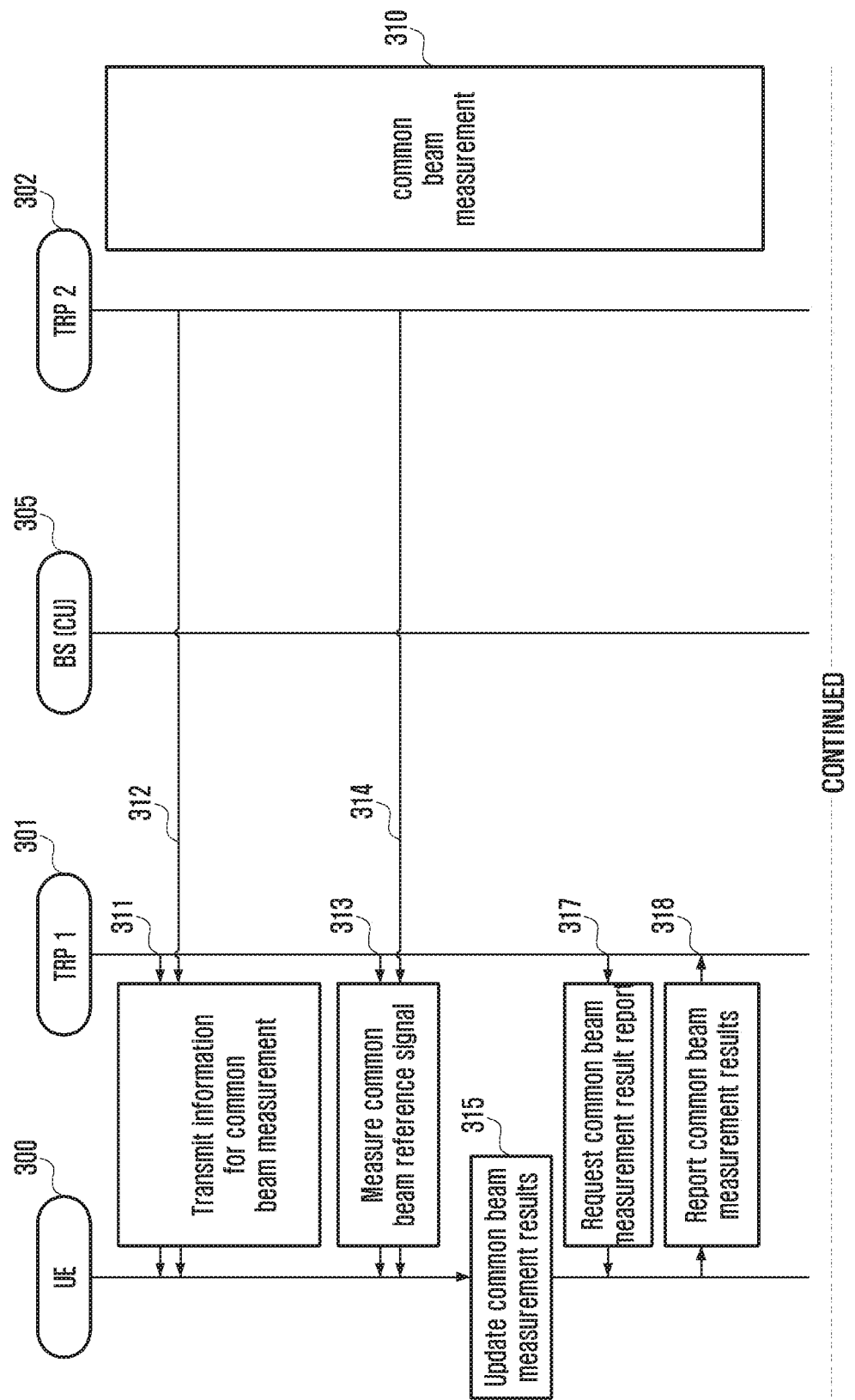
FIG. 3 is a diagram showing a method of measuring a multi-TRP beam in a multi-beam, multi-TRP environment according to an embodiment of the disclosure.

FIG. 3 is a diagram showing a method of measuring a multi-TRP beam in a multi-beam, multi-TRP environment according to an embodiment of the disclosure.

Referring to FIG. 3, a system may include a UE 300, a TRP 1 301, a TRP 2 302 and a base station 305. The UE 300 is a UE belonging to the base station 305, and exchanges information with the base station using the TRP1 301. In the embodiment of FIG. 3, different beams of different TRPs can be observed precisely and fast through two steps, such as a common beam measurement procedure and a UE dedicated beam measurement procedure.

A common beam measurement procedure 320 is to receive a common reference signal transmitted by TRPs, to search for a coarse (available) TRP beam and a UE beam pair, and to feed the measurement results of the common reference signal back. For example, the common reference signal may use a synchronization signal. The UE may perform the common beam measurement procedure using the synchronization signal.

A task of searching for the best beam using only the common reference signal requires a very long time in a system in which the number of beams is many (measurement corresponding to a maximum "number of transmission and reception points×the number of beams within a transmission and reception point×the number of UE beams" is necessary). Accordingly, a coarse beam direction is selected using the common reference signal, and UE-specific unique beam measurement is performed on fine beams adjacent to a selected beam using the coarse beam direction.

In this case, for the selection of a TRP to be transmitted by the base station and beam selection for each TRP, the UE need to feed back that it is better for different TRPs to transmit which beams and the best beam (or Best N beams) for each TRP (or best K TRP).

At operation 311, the TRP 1 301 transmits information for common beam measurement to the UE. The information may be at least one of broadcast information, multicast information, or unicast system information. The information for the common beam measurement may include at least one of random access channel (RACH) subframe information, reception beam information in an RACN subframe, a system frame number (SFN), a physical hybrid-ARQ indicator channel (PHICH), a bandwidth, an antenna port, system information scheduling information, information on a cell ID, a TRP ID, or a beam ID.

At operation 312, the TRP 2 302 may transmit information for common beam measurement to the UE 300. For information included in the information for common beam measurement, reference is made to the contents described at operation 311.

At operation 313, the UE measures a common beam reference signal for the TRP 1 301. At operation 314, the UE measures a common beam reference signal for the TRP 2 302. The UE 300 may measure the common reference signals while sweeping reception beams.

At operation 315, the UE 300 may update the common beam measurement results. The UE 300 may update the common beam measurement results for each TRP. The UE 300 performs RS measurement on different TRPs, and updates measurement information for filtering purposes, for example, if necessary.

At operation 317, the TRP 1 301 may indicate that the common beam measurement results should be reported. To report the best beam or N beams having good performance for each TRP may be indicated. Common beam measurement result report information may indicate that information on a TRP ID, a beam ID, beam quality should be reported.

At operation 318, the UE 300 may report the common beam measurement results. The UE 300 may report the common beam measurement results to the TRP 1 301. The common beam measurement results may be delivered to the CU of the base station 305.

In UE dedicated beam measurement 340, the base station 305 selects a transmission beam for each TRP, which will be transmitted to the UE 300, using the feedback information. In this case, in general, UE beams capable of receiving beams transmitted by different TRPs may be different for each TRP (because TRP locations are different). Accordingly, if the UE 300 can receive a reference signal using only one beam at once, the UE may measure only a TRP present in one direction and only a beam belonging to the corresponding TRP at a given time.

Accordingly, the base station 305 needs to transmit corresponding TRP information (e.g., ID, TRP sequence) regarding when each TRP transmits information, while transmitting UE dedicated beam measurement transmission signal scheduling information so that the UE can receive reference signals transmitted by different TRPs using a given beam at a given time. In the UE dedicated beam measurement procedure, a UE dedicated beam may be used. The UE dedicated beam may use a CSI-RS, for example.

At operation 341 and operation 342, the base station 305 selects transmission beams for each TRP using information, such as feedback information (e.g., common beam measurement results) of the UE. Furthermore, the base station 305 may schedule the reference signal of each TRP for UE dedicated beam measurement. The reference signal scheduling information for each TRP may be delivered to each TRP. The base station 305 may provide the TRP 1 301 with reference signal information for the TRP 2 302 in addition to reference signal information for the TRP 1 301. In this case, the reference signal may be the UE dedicated reference signal of each TRP.

At operation 343, the TRP 1 301 may provide the UE 300 with information on a TRP dedicated reference signal. The information on a TRP dedicated reference signal may include beam information, resource information related to a TRP ID. In addition to dedicated reference signal information of the TRP1 301, dedicated reference signal information of the TRP2 302 may be provided to the UE 300.

At operation 344, the TRP 1 301 transmits a dedicated reference signal. At operation 345, the TRP 2 302 transmits the dedicated reference signal. The UE 300 measures the dedicated reference signal transmitted by each TRP while sweeping reception beams.

At operation 346, the UE 300 updates the measurement results of the dedicated reference signal for each TRP.

At operation 347, the TRP1 301 transmits, to the UE 300, information indicating that the measurement results of the dedicated reference signal should be reported.

At operation 348, the UE 300 reports the measurement results of the dedicated reference signal for each TRP.

Figure 4:
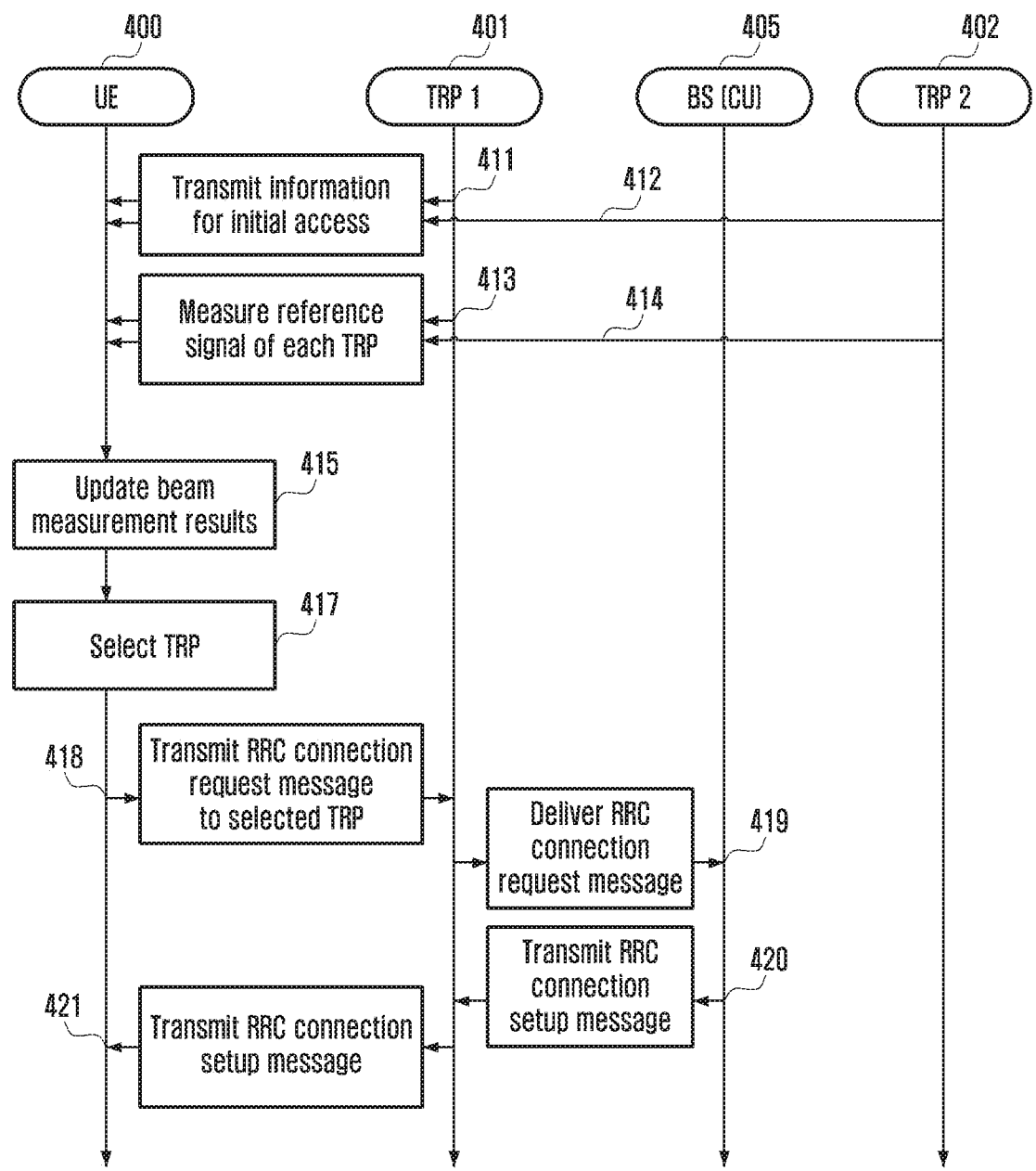
FIG. 4 is a diagram showing a terminal initial access procedure in a multi-beam, multi-TRP environment according to an embodiment of the disclosure.

FIG. 4 is a diagram showing a terminal initial access procedure in a multi-beam, multi-TRP environment according to an embodiment of the disclosure. FIG. 4 is a diagram showing an initial access procedure when TRPs can be distinguished.

Referring to FIG. 4, a system may include a UE 400, a TRP 1 401, a TRP 2 402 and a base station 405. The UE 400 is a UE belonging to the base station 405, and exchanges information with the base station using the TRP1 401.

At operation 411 and operation 413, the TRPs 401 and 401 may transmit information for initial access. The information may be at least one of broadcast, multicast, or unicast system information. The information may include at least one of random access channel (RACH) subframe information, reception beam information in an RACN subframe, a system frame number (SFN), a physical hybrid-ARQ indicator channel (PHICH), a bandwidth, an antenna port, system information scheduling information, information on a cell ID, a TRP ID, or a beam ID.

At operation 413, the UE 400 measures a beam reference signal for the TRP 1 401. At operation 414, the UE 400 measures a beam reference signal for the TRP 2 402. The reference signal may be a common reference signal. The UE 400 may measure a reference signal or common reference signal while sweeping reception beams.

At operation 415, the UE 400 may update beam measurement results. The UE 400 may update the measurement results of the common reference signal. The UE 400 may update common beam measurement results for each TRP. The UE 400 performs RS measurement on different TRPs, and updates measurement information for filtering purposes, for example, if necessary.

At operation 417, the UE may select a proper TRP for initial access based on the beam measurement result. For example, the UE may select a TRP having the best beam measurement results. In the embodiment, it is assumed that the TRP 1 401 has been selected. In the embodiment of FIG. 4, it is assumed that in the initial access results, the UE 400 may distinguish between TRPs based on beam measurement or common beam measurement. Accordingly, the UE 400 may distinguish between TRPs and select a proper TRP.

At operation 418, the UE 400 transmits a radio resource control (RRC) connection request message to the TRP 1 401. The UE 400 may transmit the RRC connection request message through a beam selected with respect to the selected TRP.

At operation 419, the TRP 1 401 may deliver an RRC connection request message to the base station 405. At operation 420, the base station 405 may transmit an RRC connection setup message to the TRP 1 401. The UE 400 may transmit the RRC connection request message using an RACH resource for the selected TRP or the selected beam. At operation 421, the TRP 1 401 may transmit the RRC connection setup message to the UE 400. The TRP1 401 may transmit the RRC connection setup message to the UE 400 using a dedicated resource.

Figure 5:
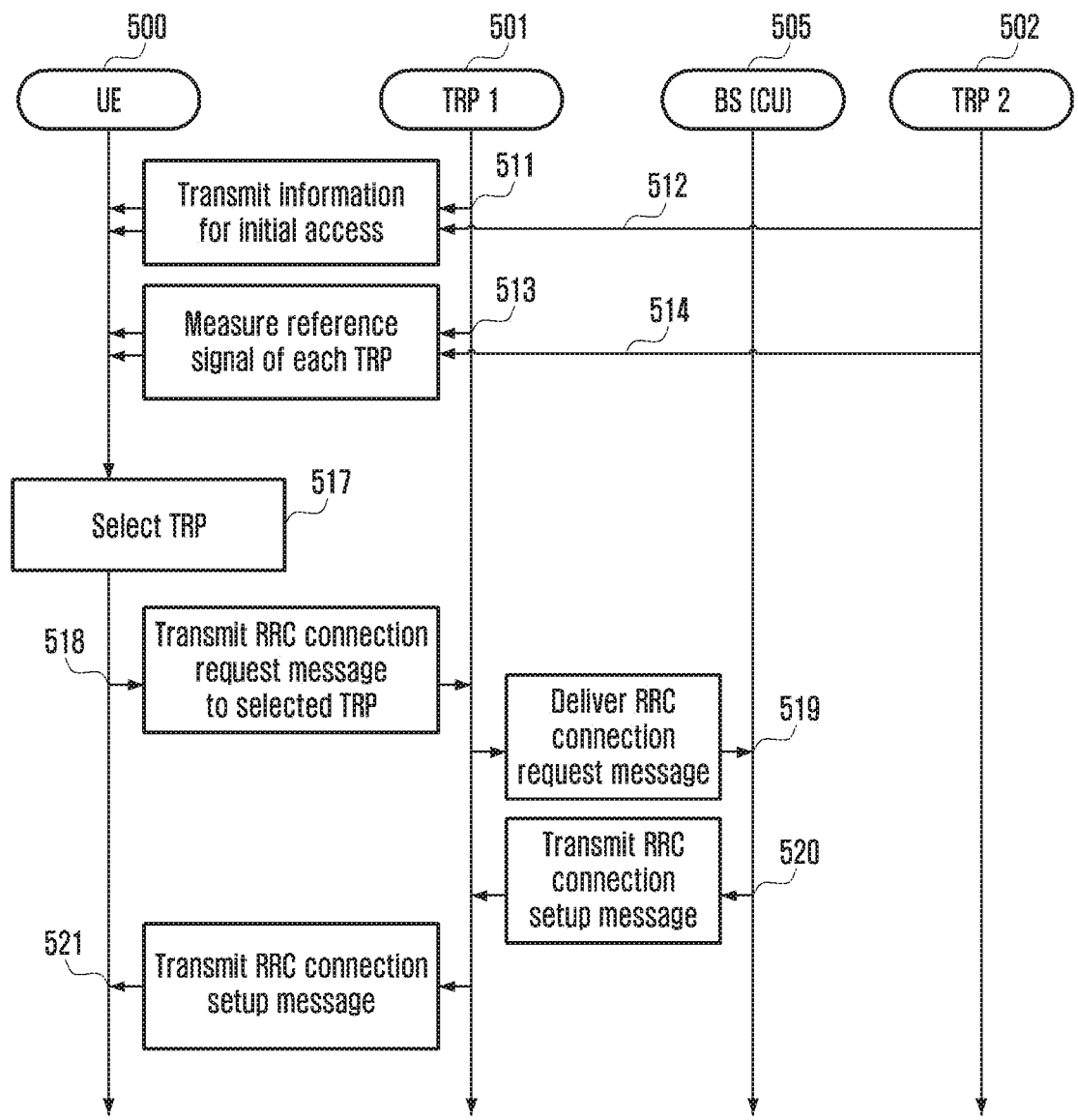
FIG. 5 is a diagram showing a terminal initial access procedure in a multi-beam, multi-TRP environment according to another embodiment of the disclosure.

FIG. 5 is a diagram showing a terminal initial access procedure in a multi-beam, multi-TRP environment according to another embodiment of the disclosure. FIG. 5 is a diagram showing an initial access procedure if TRPs cannot be distinguished.

Referring to FIG. 5, a system may include a UE 500, a TRP 1 501, a TRP 2 502 and a base station 505. The UE 500 is a UE belonging to the base station 505, and exchanges information with the base station using the TRP1 501.

At operation 511 and operation 513, the TRPs 501 and 501 may transmit information for initial access. The information may include at least one of broadcast, multicast, or unicast system information. The information may include at least one of random access channel (RACH) subframe information, reception beam information in an RACN subframe, a system frame number (SFN), a physical hybrid-ARQ indicator channel (PHICH), a bandwidth, an antenna port, system information scheduling information, information on a cell ID, a TRP ID, or a beam ID.

At operation 513, the UE 500 measures a beam reference signal for the TRP 1 501. At operation 514, the UE 500 measures a beam reference signal for the TRP 2 502. The reference signal may be a common reference signal. The UE 500 may measure a reference signal or common reference signal while sweeping reception beams.

At operation 517, the UE may select a proper beam for initial access based on the beam measurement results. For example, the UE may select a beam having the best beam measurement results. In the embodiment of FIG. 5, it is assumed that in initial access results, the UE 500 cannot distinguish between TRPs based on beam measurement or common beam measurement.

At operation 518, the UE 400 transmits a radio resource control (RRC) connection request message to the TRP 1 501. The UE 500 may transmit the RRC connection request message using an RACH resource for the selected beam. The UE 500 may transmit the RRC connection request message through the selected beam. The UE 500 may transmit information on the selected beam along with the RRC connection request message.

At operation 519, the TRP 1 501 may deliver the RRC connection request message to the base station 505. At operation 520, the base station 505 may transmit an RRC connection setup message to the TRP 1 401. At operation 521, the TRP 1 501 may transmit the RRC connection setup message to the UE 500. The TRP1 501 may transmit the RRC connection setup message to the UE 500 using a dedicated resource.

<Method for a Base Station and UE to Change a TRP>
1. TRP change method using L1 beam feedback
A. Transparent method
i. UE beam quality measurement
ii. UE beam ID, beam quality report
iii. Distinguish between beams associated with base station-reported TRP
iv. A base station transmits beam change command to a UE
v. The UE changes a beam (at a designated time/frame after a lapse of an agreed time/frame)
vi. The base station changes a beam+a TRP (at a designated time/frame after a lapse of an agreed time/frame)
B. Method using an explicit TRP ID
i. Measure beam quality for each UE TRP
ii. A UE reports a TRP ID, a beam ID, beam quality
iii. A base station determines a beam/TRP change based on the reported beam and TRP
iv. The base station transmits a TRP change command to the UE
  1. TRP ID only
  2. TRP ID+beam ID
v. The UE changes a TRP
  1. Change a TRP and use the best beam that has been implicitly previously reported
  2. Use a TRP and beam ID as commanded
vi. The base station changes a beam+TRP
  2. A beam/TRP change using MAC beam feedback
A. Change based on RACH msg 3 reception beam feedback
i. The base station transmits a TRP change command (msg 4 or a different PDCCH or mac msg) to the UE
  1. TRP ID only
  2. TRP ID+beam ID
ii. The UE changes a TRP
  1. Change a TRP and use the best beam that has been implicitly previously reported
  2. Use a TRP and beam ID as commanded
  3. At a designated time/frame after a lapse of an agreed time/frame
iii. The base station changes a beam/TRP (at a designated time/frame after a lapse of an agreed time/frame)
B. Change based on MAC CE reception
i. The base station transmits a TRP change command (msg 4 or a different PDCCH or mac msg) to the UE
  1. TRP ID only
  2. TRP ID+beam ID
ii. The UE changes a TRP
  1. Change a TRP and use the best beam that has been implicitly previously reported
  2. Use a TRP and beam ID as commanded
  3. At a designated time/frame after a lapse of an agreed time/frame
iii. The base station changes a beam/TRP (at a designated time/frame after a lapse of an agreed time/frame)
3. Method of changing a TRP feedback/change method based on an RRC configuration according to a base station/network configuration
A. If base station/network configurations are different, a TRP feedback/change method is fixed by transmitting an RRC message providing notification that the base station/network configurations are different
B. Define an RRC IE capable of transmitting the following 0~3 Config 2 bits
C. Or define an RRC IE that transmits L1/MAC signaling and change=0, RRC signaling and chang=1
i. If it is 1, feed back and change only a beam
ii. If it is 1, perform measurement for each TRP, MR report, and change after receiving a base station RRC message 4. A TRP change using RRC control msg
  A. The UE transmits measurement report based on a measurement trigger event for each TRP
    B. MR triggering events
      i. T1: measured quality of a TRP is higher than a threshold
      ii. T2: measured quality of a TRP is lower than a threshold
      iii. T3: measured quality of a neighbor TRP is offset higher than the measured quality of the serving the TRP
      iv. . . .
  C. A new RRC-connection reconfiguration IE for MR
    i. TRP ID, TRP measurement, measurement ID,
    An MR reception base station determines whether to change a TRP change and transmits it as an RRC message FIG. 6 is a diagram showing a TRP change method according to an embodiment of the disclosure.

Figure 6A:
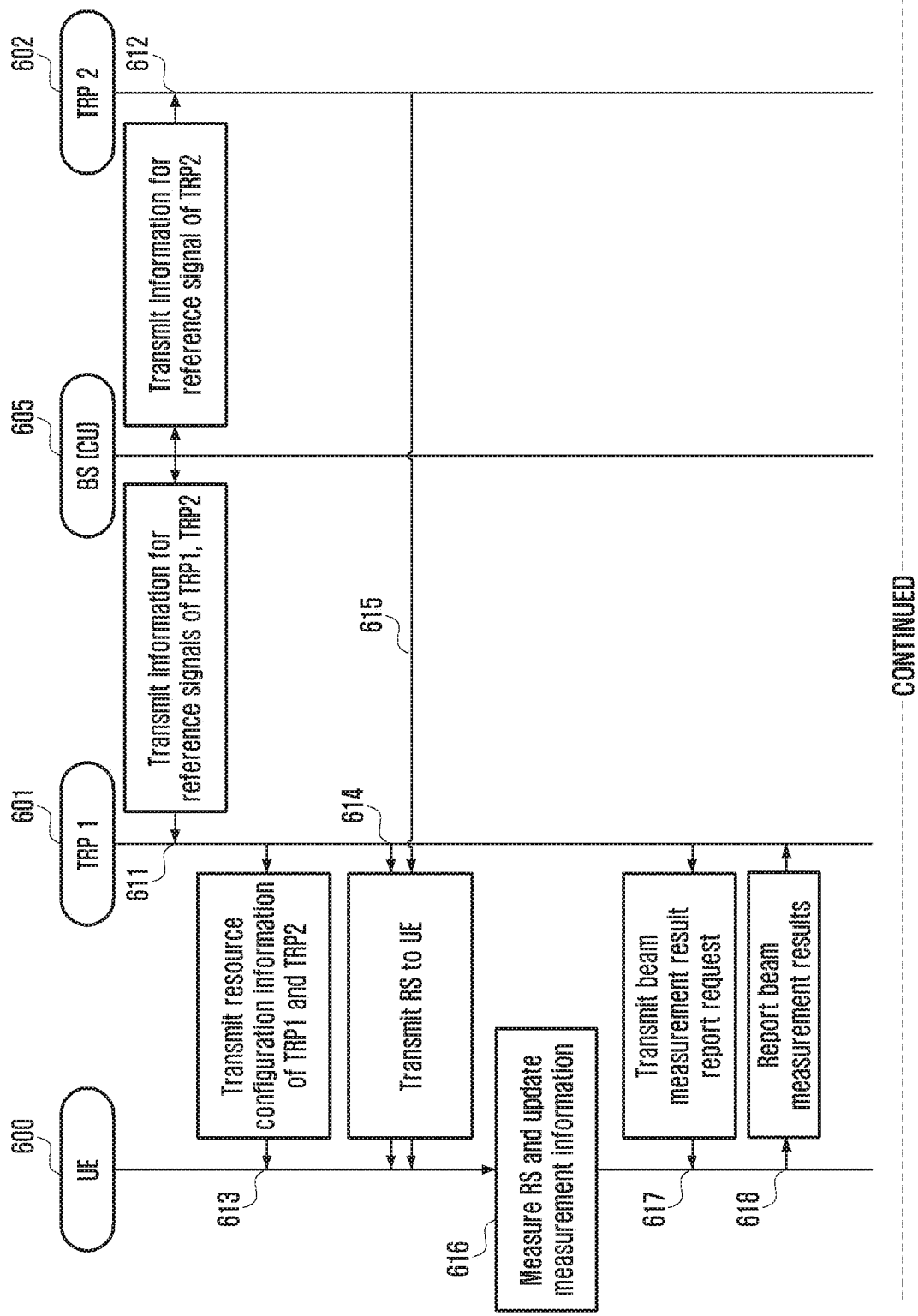
FIG. 6 is a diagram showing a TRP change method according to an embodiment of the disclosure.
Figure 6B:
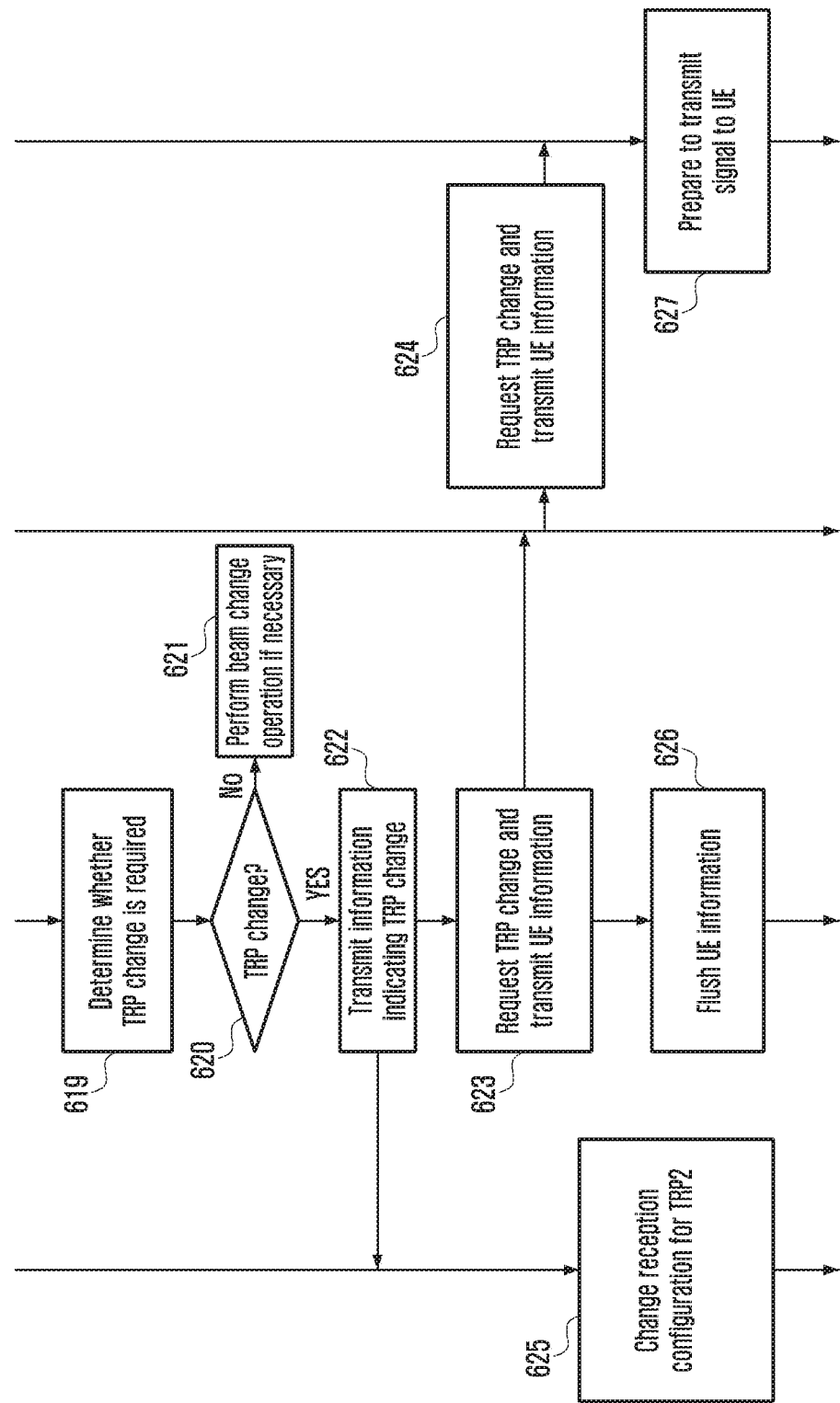

Referring to FIG. 6, a system may include a UE 600, a TRP 1 601, a TRP 2 602 and a base station 605.

Referring to FIG. 6, the UE 600 is a UE belonging to the base station 605 and exchanges information with the base station using the TRP1 601. The UE 600 may have explicitly recognized that it uses the TRP1 601 using the ID of the TRP1 601 or may not explicitly recognize that it uses the TRP1 601, and may have recognized that it also performs communication with the base station using any beams belonging to the TRP1 701, for example, a CSI-RS resource set, an NR-SS resource set, a TRP antenna Tx/Rx configuration or any beam set.

At operation 611 and operation 612, the base station 605 selects RSs to be transmitted by the TRP1 601 and the TRP2 602 the resources of the corresponding RSs so that the UE 600 can perform measurement, and delivers such information to the TRP1 601 and the TRP2 602 if the information needs to be provided to the TRPs. In this case, the TRP1 601 needs to schedule RS information of the TRP2 602 in addition to the RS of the TRP1 601 with respect to the UE 600. Accordingly, the base station 605 may provide the TRP1 601 with both RS configuration information of the TRP1 601 and configuration information of the TRP2 602.

At operation 613, the TRP1 601 provides the UE 600 with the configured resource configuration information of the TRP1 601 and TRP2 602 so that the UE 600 can measure each of the TRPs. In this case, a direct TRP ID associated with resource configuration information of a different TRP may be provided or any resource segmentation method of enabling the UE to indirectly distinguish between the TRPs, for example, a method of transmitting the RSs of different TRPs at time intervals may be used so that the UE 600 can recognize that the corresponding RSs are transmitted by different TRPs.

At operation 614, the TRP1 601 transmits an RS to the UE 600, as allocated, for measurement. At operation 615, the TRP2 602 transmits the RS to the UE 600, as allocated, for measurement.

At operation 616, the UE 600 performs RS measurement on different TRPs, and updates measurement information for filtering purposes, for example, if necessary.

At operation 617, the TRP 1 601 may indicate that beam measurement results should be reported. The TRP 1 601 may indicate that the best beam or N beams having good performance should be reported for each TRP. The beam measurement result report information may indicate that information on a TRP ID, beam ID, beam quality should be reported.

At operation 618, the UE 600 may report beam measurement results. The UE 600 may report the beam measurement results to the TRP 1 601.

At operation 619, the TRP1 601 may determine whether a TRP change is required. The TRP1 601 may determine whether a TRP change is required based on the reported measurement results. The determination method may be the same as a measurement report transmission event. For example, when the measurement results of the reference signal of the TRP2 are greater than the measurement results of the reference signal of the TRP1 by a value of a preset offset, the TRP1 601 may determine that a TRP change is required.

At operation 620, if it is determined that a TRP change is not required, the process proceeds to operation 621. If it is determined that a TRP change is required, the process proceeds to operation 622.

At operation 621, the TRP1 601 does not need to provide the UE 600 with any information related to a TRP change. However, even in such a case, the UE 600 may need to change a beam being used within the same TRP. In such a case, the TRP1 601 may enable the UE 600 to perform a beam change.

At operation 622, the TRP1 601 transmits information for requesting (e.g., TRP change indication information) a TRP change operation to the UE 600. At operation 622, the TRP1 601 transmits information for requesting a TRP change operation to the UE 600. The TRP change indication information (TRP change indication message) may be a physical layer message (PHY downlink control information), may be a MAC CE message, and may be an IE included in an RRE message, for example, an RRC connection reconfiguration message. For a detailed example that may be included in the corresponding TRP change signal, reference is made to the embodiment of FIG. 7.

At operation 623, the TRP1 601 provides a TRP change request and UE information to the base station 605. A procedure of notifying the base station 605 of information indicating that a TRP change is necessary is necessary because the TRP1 601 has determined a TRP change. The information may include at least one of a UE ID, a UE best beam/CSI-RS/NR-SS ID, the best beam/CSI-RS/NR-SS ID measured by a UE and a measured value of the TRP 2, MAC information, RLC information, or TRP2 timing advance measurement information of the UE, etc.

At operation 624, the base station 605 may provide the TRP2 602 with a TRP change request and UE information. The TRP2 602 may prepare the joining of the UE based on the TRP change request and UE information.

At operation 625, the UE 600 prepares to receive information of a target TRP, the TRP 2 included in the corresponding TRP change request message over a fixed time after the TRP change request message is received or until a scheduled resource is received. The UE 600 changes a reception configuration so that the reception beam of the UE 600 is suitable for the reception of the downlink resource of the TRP2 included in the TRP change request message and a beam/CSI-RS/NR-SS having a beam association (QCL) relation with the corresponding resource.

At operation 626, the TRP1 601 flushes information on the UE 600.

At operation 627, the TRP2 602 prepares to transmit a signal, included in the TRP change request message, to the UE over the fixed time after the TRP change request message is received.

Figure 7B:
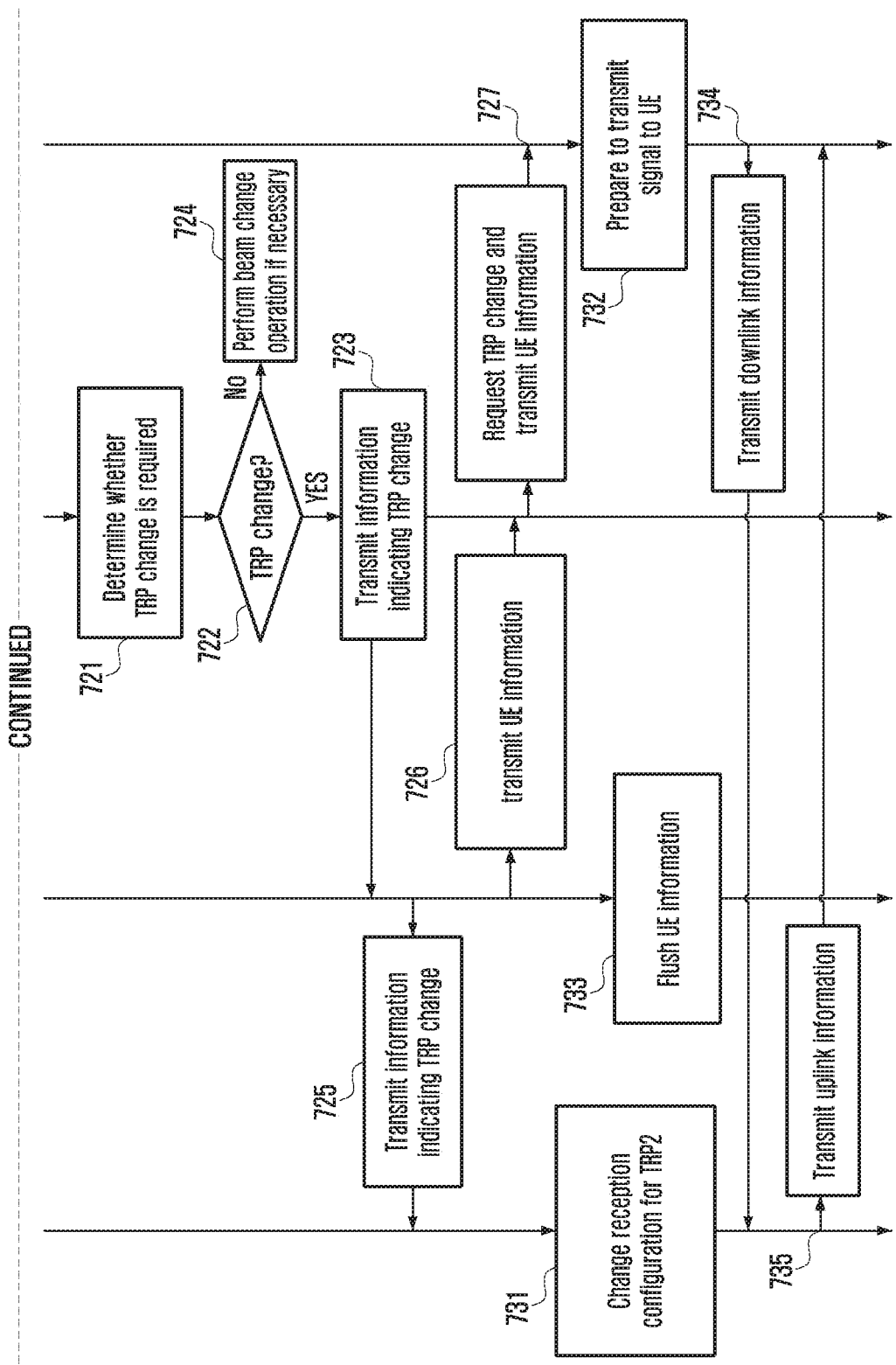

FIG. 7 is a diagram showing a TRP change method of a base station through the RS measurement of a terminal according to an embodiment of the disclosure.

Referring to FIG. 7, a system may include a UE 700, a TRP 1 701, a TRP 2 702 and a base station 705.

The UE 700 is a UE 700 belonging to the base station 705 and exchanges information with the base station using the TRP1 701. The UE 700 may have explicitly recognized that it uses the TRP1 701 using the ID of the TRP1 701 or may not explicitly recognized that it uses the TRP1 701, and may have recognized that it performs communication with the base station using any beams belonging to the TRP1 701, for example, a CSI-RS resource set, an NR-SS resource set, a TRP antenna Tx/Rx configuration or any beam set.

At operation 711 and operation 712, the base station 705 selects RSs to be transmitted by the TRP1 701 and the TRP2 702 and the resources of the corresponding RSs so that the UE 700 can perform measurement, and delivers such information to the TRP1 701 and the TRP2 702 if the information needs to be provided to the TRPs. In this case, the TRP1 701 needs to schedule RS information of the TRP2 702 in addition to the RS of the TRP1 701 with respect to the UE 700. Accordingly, the base station 705 may provide the TRP1 701 with both RS configuration information of the TRP1 701 and RS configuration information of the TRP2 702.

At operation 713, the TRP1 701 provides the configured resource configuration information of the TRP1 701 and TRP2 702 to the UE 700 so that the UE 700 can measure each of the TRPs. The resource configuration information may include RS configuration information of the TRP1 701 and RS configuration information of the TRP2 702. In this case, a direct TRP ID associated with resource configuration information of a different TRP may be provided or any resource segmentation method of enabling the UE to indirectly distinguish between the TRPs, for example, a method of transmitting the RSs of different TRPs at time intervals may be used so that the UE 700 can recognize that the corresponding RSs are transmitted by different TRPs.

At operation 714, the TRP1 transmits an RS to the UE 700, as allocated, for measurement. At operation 715, the TRP2 702 transmits the RS to the UE 700, as allocated, for measurement.

At operation 716, the UE 700 performs RS measurement on different TRPs, and updates measurement information for filtering purposes, for example, if necessary.

At operation 717, a network may configure RRM measurement by transmitting an RRC connection reconfiguration message for the TRP measurement and report of the UE, and may configure measurement report transmission. At operation 717, the base station 705 may transmit the RRC connection reconfiguration message to the TRP1 701. At operation 718, the TRP1 701 may deliver the RRC connection reconfiguration message to the UE 700. The message of operation 717 and operation 718 may have included the RS scheduling message of operation 713 or the measurement event configuration of operation 717 and operation 717 may have been included in the RS scheduling message of operation 713. A measurement report transmission event of the UE that may be taken into consideration may be the A1~A6 events of the LTE standard or may be the C1, C2 events or may be the following events of a form modified from the existing C1, C2 events.

Event C1': when a CSI-RS resource set (or TRP or NR-SS resource set or beam set or antenna configuration set) is greater than a set absolute threshold;

Event C2': when a CSI-RS resource set (or TRP or NR-SS resource set or beam set or antenna configuration set) is better than a reference CSI-RS resource set (or TRP or NR-SS resource set or beam set or antenna configuration set) by a set offset or more Event C1' (when a CSI-RS resource set is greater than a set absolute threshold;

The UE confirms:
1> whether the following specified condition C1-1' is satisfied by taking into consideration the following specified condition C1-1' as the entry condition of an event;
1> Whether the following specified condition C1-2' is satisfied by taking into consideration the following specified condition C1-2' as the escape condition of an event;

Inequality C1-1' (entry condition)

$Mcr+Ocr-Hys>Thresh$

Inequality C1-2' (escape condition)

$Mcr+Ocr+Hys<Thresh$

The variables of the equation are defined as follows:
Mcr is a measured value of a CSI-RS resource set in which any offset is not taken into consideration.
NOTE: In this case, Mcr may be derived through a measured value of one or one or more CSI-RS resources included in the CSI-RS resource set, and may have included multiple CSI-RS measurement values. The UE may derive one Mcr using the multiple CSI-RS measurement values.

An example of methods that may be used to derive Mcr is as follows:
After filtering, the best N CSI-RS measurement values are averaged in order of measured values
After filtering, measured values included in any condition among the best N CSI-RS measurement values, for example, within a counterpart value offset in an absolute value or more or the best measurement value are averaged in order of the measured values
After filtering, the best N CSI-RS measurement values are added in order of measured values
After filtering, measured values included in any condition among the best N CSI-RS measurement values, for example, within a counterpart value offset in an absolute value or more or the best measurement value are added in order of the measured values.

※ Filtering may be performed in various layers, for example, L1 or L2 or L3. A method, such as weight averaging by applying an arithmetic average, a geometric average or weight set by a network to measured value ordering, may be used as a method for averaging.

Ocr is a CSI-RS resource set unique offset. Hys is a hysteresis parameter for a corresponding event, and Thresh is a threshold for the corresponding event.

Mcr, Thresh is represented in dBm.

Ocr, Hys is represented in dB.

Event C2' (when a CSI-RS resource set is better than a reference CSI-RS resource set by an offset or more)

The UE confirms:
1> whether the following specified condition C2-1' is satisfied by taking into consideration the following specified condition C2-1' as the entry condition of an event;
1> whether the following specified condition C2-2' is satisfied by taking into consideration the following specified condition C2-2' as the escape condition of an event;

Inequality C2-1' (entry condition)

$Mcr+Ocr-Hys>Mref+Oref+Off$

Inequality C2-2' (escape condition)

$Mcr+Ocr+Hys<Mref+Oref+Off$

The variables in the formula are defined as follows:
Mcr is a measured value of a CSI-RS resource set in which any offset is not taken into consideration.
NOTE: In this case, Mcr may be derived through a measured value of one or one or more CSI-RS resources included in a CSI-RS resource set, and may have included multiple CSI-RS measurement values. The UE may derive one Mcr using the multiple CSI-RS measurement values.

An example of methods that may be used to derive Mcr is described in the event C1'.

Ocr is a CSI-RS resource set unique offset

Mref is a measured value of a reference CSI-RS resource set.

Oref is a unique offset value of a reference CSI-RS resource set.

Hys is a hysteresis parameter for a corresponding event, and Thresh is a threshold for the corresponding event.

Off is the parameter of the corresponding event

Mcr, Mref is represented in dBm.

Ocr, Oref, Hys, Off are represented in dB.

In an embodiment of the disclosure, an event that was a reference has been written in the form of a CSI-RS resource set change event because is a CSI-RS-based event. A method for a UE to calculate the measurement results (Mcr) of one CSI-RS resource set has various possibilities, and methods that may be taken into consideration are as follows:

The mean or sum of measured values satisfying a given condition (e.g., having a relative/absolute threshold or more) among N best CSI-RS measurement values (L1/or L2/or L3 filtered)

The mean may be weighted averaging. A base station may transmit such weight, N, filtering coefficient, etc. to a UE while transmitting a measurement configuration.

Operation 719 and operation 720 are a procedure for the UE 700 to report measurement to the base station 705 based on the preset condition. At operation 719, when the preset event condition is satisfied, the UE 700 reports the measurement results to the measurement TRP 1 701. At operation 720, the TRP 1 701 reports the measurement results, received from the UE 700, to the base station 705. The corresponding measurement report may be transmitted from the UE 700 to the base station 705 when any condition (event) set by the base station 705 is satisfied or when set periodicity is satisfied.

At operation 720, the base station 705 determines whether the UE 700 needs to change a TRP based on the reported measurement information. The determination method may be the same as the measurement report transmission event of the UE 700 or may be a base station implementation.

If a TRP change is not required at operation 722, the process proceeds to operation 724. At operation 724, the base station 705 does not need to provide the UE 700 with any information related to a TRP change. However, even in such a case, the UE 700 may need to change a beam being used within the same TRP. In such a case, the base station 705 may enable the UE 700 to perform a beam change.

If a TRP change is required at operation 722, the process proceeds to operation 723. At operation 723 and operation 725, the base station 705 transmits information for requesting a TRP change operation to the UE 705. At operation 723, the base station 705 transmits the information for requesting (e.g., TRP change indication information) a TRP change operation to the TRP1 701. At operation 725, the TRP1 701 delivers the information for requesting a TRP change operation to the UE 700.

TRP change indication information (TRP change indication message) may be a physical layer message (PHY downlink control information), may be a MAC CE message, may be an IE included in an RRE message, for example, an RRC connection reconfiguration message. A corresponding TRP change signal may include some or all of the following information.

TRP ID

CSI-RS resource set ID

NR-SS resource set ID

Beam set ID

Beam ID(s)

CSI-RS ID(s)

NR-SS ID(s)

Downlink resource scheduling including the CSI-RS, NR-SS of a TRP being used or some or all of the following information having an association relation with any beam or any antenna configuration ->Quasi-co location (QCL) ID representing a beam association, providing notification that a base station will transmit information using which beam as a corresponding resource ->a CSI RS ID having a QCL relation with a corresponding resource ->an NR-SS ID having a QCL relation with a corresponding resource Downlink resource scheduling including the CSI-RS, NR-SS of a target TRP to be changed in the future or some or all of the following information having an association relation with any beam or any antenna configuration ->Quasi-co location (QCL) ID representing a beam association, providing notification that a base station will transmit information using which beam as a corresponding resource ->a CSI RS ID having a QCL relation with a corresponding resource ->an NR-SS ID having a QCL relation with a corresponding resource Uplink resource scheduling including the CSI-RS, NR-SS of a target TRP to be changed in the future or some or all of the following information having an association relation with any beam or any antenna configuration ->Quasi-co location (QCL) ID representing a beam association providing notification that a base station will receive information using what beam as a corresponding resource ->a CSI RS ID having a QCL relation with a corresponding resource ->an NR-SS ID having a QCL relation with a corresponding resource At operation 726, the TRP1 701 transmits UE information to the central unit of the base station 705. If all contents have been previously included in the measurement report at operation 720, operation 726 is an operation that may be omitted. The UE information that may be transmitted at operation 726 or operation 720 may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

Operation 727 is an operation for the base station 705 to prepare the TRP2 702 for the joining of the UE 700, and is an operation that may be omitted if the TRP2 702 includes only a simple RF stage or antenna. UE information that may be transmitted at operation 727 may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

At operation 731, the UE 700 prepares to receive information of a target TRP, the TRP 2, included in the corresponding TRP change indication information, over a fixed time after the TRP change indication information is received at operation 725 or until a scheduled resource is received. The UE 700 changes a reception configuration so that the reception beam of the UE 700 is suitable for the reception of the downlink resource of the TRP2 included in the TRP change indication information and a beam/CSI-RS/NR-SS having a beam association (QCL) relation with the corresponding resource.

At operation 732, the TRP2 702 prepares to transmit a signal to a UE, included in the TRP change indication information, over a fixed time after the TRP change indication information is received.

At operation 733, the TRP1 701 flushes information on the UE 700.

At operation 734, the TRP2 prepares downlink transmission as already allocated to the UE. A method for the base station to determine downlink information to be transmitted and transmitted information, and the operation of the UE may include some or all of the following operations and transmission information.

Information 1) an RACH execution indicator or an RACH resource allocation method If a given UE needs to change a given TRP (or CSI-RS resource set, or NR-SS resource set, or beam set), the TRP2 (or base station) may transmit both or one or more of an indicator indicative of RACH execution in order to obtain new TRP uplink synchronization or a dedicated RACH configuration through a downlink signal that transmits a corresponding change to the UE.

The corresponding RACH configuration may have included some or all of types of information of a target TRP (or CSI-RS resource set, or NR-SS resource set, or beam set) to be changed, for example, a TRP ID, a TRP transmission CSI-RS ID, an NR-SS ID.

The base station measures the signal (UL SRS, UL CSI-RS, UL SR, . . . ), transmitted by the UE, through a different beam/TRP/beam belonging to a TRP. If one or more of the following conditions are satisfied, the base station may determine that RACH execution is necessary for a TRP change for the corresponding UE. The base station may include an indicator in a downlink signal in order to denote the execution of an RACH, may transmit the indicator and an RACH configuration or may simply transmit the RACH configuration or may transmit only a difference between an RACH configuration being used and an RACH configuration to be changed.

i. When a probability that the uplink synchronization of the UE will be broken is a given threshold or more if the UE changes a current uplink transmission beam pair (UE beam-base station beam) to a new transmission beam pair ii. If the UE changes an uplink transmission beam pair (UE beam-base station beam) being used to a new transmission beam pair, when the uplink synchronization timing advance (timing advance difference) value between the two different beam pairs is a given threshold or more The UE that has received RACH-related information transmitted by the base station may immediately perform information transmission to a new TRP using the corresponding RACH information or after a given time set by the base station elapses.

Information 2) TA modification request information and modification value

If a given UE needs to change a given TRP (or CSI-RS resource set, or NR-SS resource set, or beam set), a base station may check a difference between a timing advance value, measured using a target TRP (or CSI-RS resource set, or NR-SS resource set, or beam set) that may change a given signal (e.g., SRS signal, UL RS signal) transmitted by the corresponding UE, and a TRP (or CSI-RS resource set, or NR-SS resource set, or beam set) value being used in a conventional technology in order to obtain uplink synchronization, and may transmit the corresponding timing advance difference or the timing advance value of the TRP through a downlink signal in which a corresponding change is transmitted to the UE. The base station may include an indicator in the downlink signal in order to indicate that a TA should be modified, may transmit the indicator and a TA value or may simply transmit the TA value or may transmit a difference between a TA value being used and a TA value to be changed.

Target TRP (or CSI-RS resource set, or NR-SS resource set, or beam set) information to be changed, for example, some or all of the following information may have been included in the corresponding timing advance configuration value.

TRP ID
  beam RS set ID
  CSI-RS resource set ID
  NR-SS resource set ID
  beam ID(s))
  CSI-RS ID(s)
  NR-SS ID(s)
  Downlink resource scheduling including the CSI-RS, NR-SS of a beam RS set being used or some or all of the following information having an association relation with any beam or any antenna configuration 'Quasi-co location (QCL) ID representing a beam association, providing notification that a base station will transmit information using what beam as a corresponding resource 'CSI RS ID having a QCL relation with a corresponding resource 'NR-SS ID having a QCL relation with a corresponding resource Downlink resource scheduling including the CSI-RS, NR-SS of a target beam RS set to be changed in the future or some or all of the following information having an association relation with any beam or any antenna configuration 'Quasi-co location (QCL) ID representing a beam association, providing notification that a base station will transmit information using what beam as a corresponding resource 'CSI RS ID having a QCL relation with a corresponding resource 'NR-SS ID having a QCL relation with a corresponding resource Uplink resource scheduling including the CSI-RS, NR-SS of a target beam RS set to be changed in the future or some or all of the following information having an association relation with any beam or any antenna configuration 'Quasi-co location (QCL) ID representing a beam association, providing notification that a base station will receive information using what beam as a corresponding resource 'CSI RS ID having a QCL relation with a corresponding resource 'NR-SS ID having a QCL relation with a corresponding resource In addition to the method for the TRP to directly provide the UE with (dedicated signal) information, a base station may provide that transmission and reception between TRPs needs to be changed as a network common signal.

In an embodiment, a base station includes information in a reference signal (RS), transmitted by a different TRP, in the form of an indicator (or group ID). A UE may read the RS and perform a TA change or RACH only when transmission and reception between corresponding TRPs (or TRPs belonging to a different group) is changed.

In another embodiment, a base station may transmit an indicator, indicating that a TA change or RACH execution is necessary, through a broadcasting signal (or multicasting signal) only when UE transmission and reception between different TRPs is changed.

At operation 735, the UE 700 starts communication with the TRP2 702 based on the TRP change indication information and the message received from the TRP2 702. In this case, transmittable information may have various form, and may include a response message or acknowledge message for the downlink transmission of the TRP 2 or RACH preamble signal transmission.

The TRP1 701 and the TRP2 702 may be substituted with CSI-RS resource set1 and set2, NR-SS resource set1 and 2, or beam set1 and set2, or base station antenna configuration set1 and set2 and applied and used.

Figure 8:
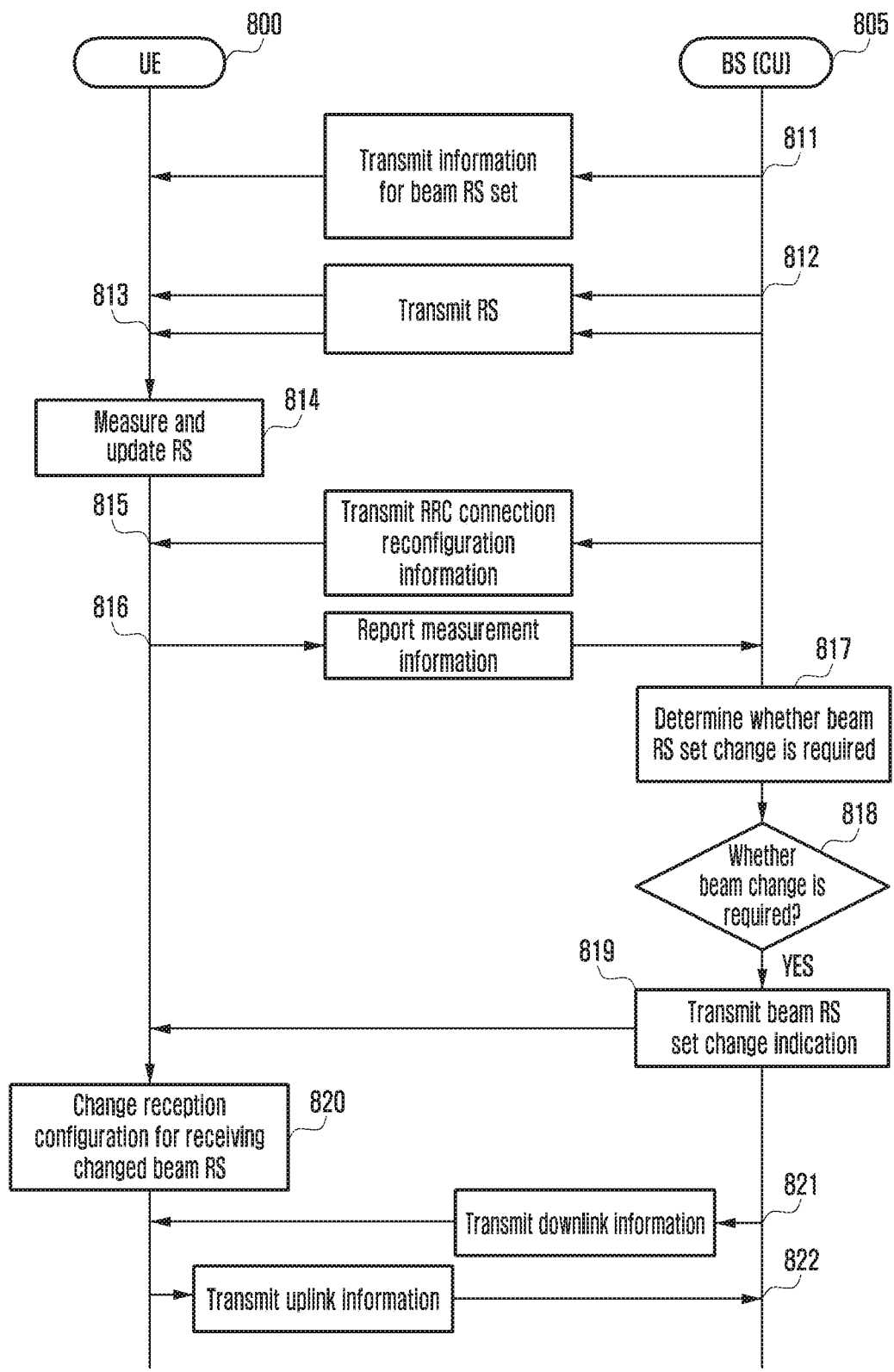
FIG. 8 is a diagram showing a beam RS set change method of a base station through the RS measurement of a terminal in an embodiment of the disclosure.

FIG. 8 is a diagram showing a method for a base station to change a beam RS set (CSI/RS resource set/NR-SS resource set/beam resource set/antenna configuration set) through the RS measurement of a terminal in an embodiment of the disclosure.

Referring to FIG. 8, a system may include a UE 800 and a base station 805. First, the UE 800 is a UE belonging to the base station 805, and exchanges information with the base station 805 using a beam RS set1. The UE 800 may have explicitly recognized that it uses the beam RS sett using the ID of the beam RS set1 or may not explicitly recognize that it uses the beam RS set1 or may have recognized that it performs communication with the base station using any beams belonging to the beam RS set1, for example, a CSI-RS resource set, an NR-SS resource set, a TRP antenna Tx/Rx configuration or any beam set. The beam RS sett may correspond to a TRP 1.

At operation 811, the base station 805 selects RSs to be transmitted by the beam RS set1 and a beam RS set2 and the resources of the corresponding RSs so that the corresponding UE 800 can perform measurement, and schedules a resource in which the corresponding RSs will be transmitted in advance with respect to the UE.

At operation 812 and operation 813, the base station 805 transmits the RSs to the corresponding UE 802, as allocated, for measurement. At operation 812, the base station may transmit the RS corresponding to the beam RS set 1. At operation 813, the base station may transmit the RS corresponding to the beam RS set 2. The beam RS set 2 may correspond to a TRP 2.

At operation 814, the UE 800 performs RS measurement on the different beam RS sets, and updates measurement information for filtering purposes, for example, if necessary.

At operation 815, a network may configure RRM measurement by transmitting an RRC connection reconfiguration message for the beam RS set measurement and report of the UE, and may configure measurement report transmission. The message of operation 815 may include the RS scheduling message of operation 811. The measurement event configuration of operation 815 may be included in the RS scheduling message of operation 811. A measurement report transmission event of the UE that may be taken into consideration may be the A1~A6 events of the LTE standard or may be the C1, C2 events or may be the C1' and C2' events modified from the existing C1 and C2 events and described in FIG. 7.

Operation 816 is a procedure for the UE 800 to report measurement to the base station based on a condition configured at operation 815. The corresponding measurement report may be transmitted from the UE to the base station when any condition (event) configured by the base station is satisfied or set periodicity is satisfied.

At operation 817, the base station determines whether the UE needs to change a beam RS set based on the reported measurement information. The determination method may be the same as the measurement report transmission event of the UE or may be a base station implementation.

If a beam RS set change is not required at operation 818, the base station 805 does not need to provide the UE 800 with any information related to the beam RS set change. However, even in such a case, the UE 800 may need to change a beam being used within the same beam RS set. In such a case, the base station 805 may enable the UE 800 to perform a beam change.

If it is determined that a beam RS set change is required at operation 818, the process proceeds to operation 819. At operation 819, the base station 805 transmits information for requesting a beam RS set change operation to the UE 800 as the beam RS set change is changed. The beam RS set change signal (beam RS set change indication message) may be a physical layer message (PHY downlink control information), may be a MAC CE message, may be an IE included in an RRE message, for example, an RRC connection reconfiguration message. The corresponding beam RS set change signal may include some or all of the following information.

beam RS set ID
CSI-RS resource set ID
NR-SS resource set ID
beam ID(s)
CSI-RS ID(s)
NR-SS ID(s)
Downlink resource scheduling including the CSI-RS, NR-SS of a beam RS set being used or some or all of the following information having an association relation with any beam or any antenna configuration
' Quasi-co location (QCL) ID representing a beam association, providing notification that a base station will transmit information using what beam as a corresponding resource
'CSI RS ID having a QCL relation with a corresponding resource
'NR-SS ID having a QCL relation with a corresponding resource
Downlink resource scheduling including the CSI-RS, NR-SS of a target beam RS set to be changed in the future or some or all of the following information having an association relation with any beam or any antenna configuration
' Quasi-co location (QCL) ID representing a beam association, providing notification that a base station will transmit information using what beam as a corresponding resource
'CSI RS ID having a QCL relation with a corresponding resource
'NR-SS ID having a QCL relation with a corresponding resource
Uplink resource scheduling including the CSI-RS, NR-SS of a target beam RS set to be changed in the future or some or all of the following information having an association relation with any beam or any antenna configuration ' Quasi-co location (QCL) ID representing a beam association, providing notification that a base station will receive information using what beam as a corresponding resource 'CSI RS ID having a QCL relation with a corresponding resource 'NR-SS ID having a QCL relation with a corresponding resource At operation 820, the UE 800 changes a reception configuration so that the reception beam of the UE is suitable for the reception of the downlink resource of the beam RS set2 included in the beam RS set change indication information and a beam/CSI-RS/NR-SS having a beam association (QCL) relation with the corresponding resource in order to prepare to receive information of the target beam RS set2 included in the corresponding beam RS set change indication information over a fixed time after the beam RS set change indication information is received at operation 819 or a scheduled resource.

At operation 821, the beam RS set2 prepares downlink transmission as already allocated to the UE 800. Transmittable downlink information may have included some or all of the following information.

A beam RS set2 connection grant, timing Advance change information, RACH request information, etc.

At operation 822, the UE 800 starts communication using some or all of the beams of the beam RS set2 based on the beam RS set change indication information and the message received from the beam RS set2. In this case, transmittable information may have various form, and may include a response message or acknowledge message or RACH preamble signal transmission for the downlink transmission of the beam RS set2.

The beam RS sett and the beam RS set2 may be substituted with CSI-RS resource set1 and set2, NR-SS resource set1 and 2, beam set1 and set2, a TRP1 and a TRP2, or base station antenna configuration set1 and set2 and applied and used.

Figure 9B:
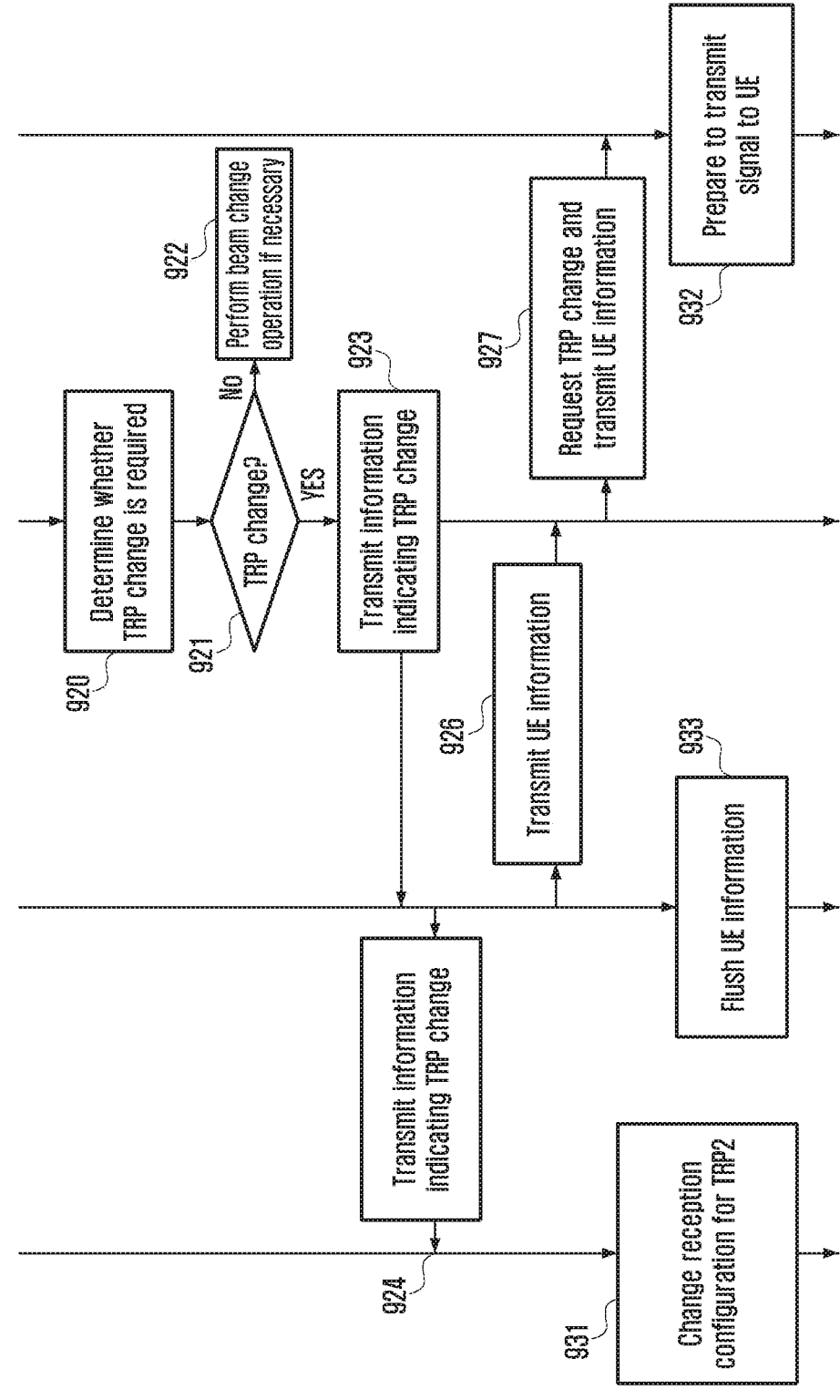
FIG. 9 is a diagram showing a TRP change method when a base station controls the mobility of a terminal in an embodiment of the disclosure.

FIG. 9 is a diagram showing a TRP change method when a base station controls the mobility of a terminal in an embodiment of the disclosure.

Referring to FIG. 9, a system may include a UE 900, a TRP 1 901, a TRP 2 902 and a base station 905.

The UE 900 is a UE belonging to the base station 905 and exchanges information with the base station using the TRP1 901. The UE 900 may have explicitly recognized that it uses the TRP1 901 using the ID of the TRP1 901 or may not explicitly recognize that it uses the TRP1 901 and may recognize that it performs communication with the base station using any beams belonging to the TRP1 901, for example, a CSI-RS resource set, an NR-SS resource set, a TRP antenna Tx/Rx configuration or a given beam set.

At operation 911 and operation 912, the base station 905 selects RSs to be transmitted by the TRP1 901 and the TRP2 902 and the resources of the corresponding RSs so that the UE 900 can perform measurement, and delivers such information to the TRP1 901 and the TRP2 902 if the information needs to be provided to the TRPs. In this case, the TRP1 901 needs to schedule RS information of the TRP2 902 with respect to the UE 900 in addition to the RS of the TRP1 901. Accordingly, the base station 905 may provide the TRP1 901 with both RS configuration information of the TRP1 901 and configuration information of the TRP2 902.

At operation 913, the TRP1 901 provides the UE 900 with the configured resource configuration information of the TRP1 901 and the TRP2 902 so that the UE 900 can measure each of the TRPs. In this case, a direct TRP ID associated with resource configuration information of a different TRP may be provided or any resource segmentation method of enabling the UE to indirectly distinguish between the TRPs, for example, a method of transmitting the RSs of different TRPs at time intervals may be used so that the UE 900 can recognize that the corresponding RSs are transmitted by different TRPs.

At operation 914, the TRP1 901 transmits the RS to the UE 900, as allocated, for measurement. At operation 915, the TRP2 902 transmits the RS to the UE 900, as allocated, for measurement.

At operation 916, the UE 900 performs RS measurement on different TRPs, and updates measurement information for filtering purposes, for example, if necessary.

At operation 917, the TRP 1 901 may indicate that beam measurement results should be reported. The TRP 1 901 may indicate that the best beam or N beams having good performance should be reported for each TRP. The beam measurement result report information may indicate that information on a TRP ID, a beam ID, beam quality should be reported.

At operation 918, the UE 900 may report beam measurement results. The UE 900 may report the beam measurement results to the TRP 1 901. The beam measurement results may include the best beam for each TRP or N beams having good performance for each TRP, and may also include ID information of the UE.

At operation 919, the TRP1 901 transmits the feedback information, received from the UE 900, to the base station 905. The TRP1 901 may transmit the ID information of the UE and information on the best beam for each TRP or the N beams having good performance for each TRP to the base station 905.

At operation 920, the base station 905 may determine whether a TRP change is required. The base station 905 may determine whether a TRP change is required based on information received from the TRP1 901. The determination method may be the same as a measurement report transmission event. For example, when the measurement results of the reference signal of the TRP2 is greater than the measurement results of the reference signal of the TRP1 by a value of a preset offset, the base station may determine that a TRP change is required.

If it is determined that a TRP change is not required at operation 921, the process proceeds to operation 922. If it is determined that a TRP change is required, the process proceeds to operation 923.

At operation 922, the base station 905 does not need to provide the UE 900 with any information related to a TRP change. However, even in such a case, the UE 900 may need to change a beam being used within the same TRP. In such a case, the TRP1 901 may enable the UE 900 to perform a beam change.

At operation 923, the base station 905 transmits information for requesting (e.g., TRP change indication information) a TRP change operation to the TRP1 901. At operation 924, the TRP1 901 transmits the information for requesting a TRP change operation to the UE 900. TRP change indication information (TRP change indication message) may be a physical layer message (PHY downlink control information), may be a MAC CE message, may be an IE included in an RRE message, for example, an RRC connection reconfiguration message. For a detailed example that may be included in the corresponding TRP change signal, reference is made to the embodiment of FIG. 7.

At operation 926, the TRP1 901 transmits UE information to the central unit of the base station 905. If all contents have been previously included in the measurement report at operation 919, operation 926 is an operation that may be omitted. The UE information that may be transmitted at operation 926 or operation 919 may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

Operation 927 is an operation for the base station 905 to prepare the TRP2 902 for the joining of the UE 900, and is an operation that may be omitted if the TRP2 902 includes only a simple RF stage or antenna. At operation 927, UE information that may be transmitted may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

At operation 931, the UE 900 prepares to receive information of a target TRP, the TRP 2 included in the corresponding TRP change indication information over a fixed time after the TRP change indication information is received at operation 924 or until a scheduled resource is received. The UE 900 changes a reception configuration so that its own reception beam is suitable for the reception of the downlink resource of the TRP2 902 included in the TRP change indication information and a beam/CSI-RS/NR-SS having a beam association (QCL) relation with the corresponding resource.

At operation 932, the TRP2 902 prepares to transmit a signal to the UE 900, included in the TRP change indication information, over a fixed time after the TRP change indication information is received.

At operation 933, the TRP1 901 flushes information on the UE 900.

Thereafter, the UE 900 and the TRP2 902 may perform communication.

Figure 10A:
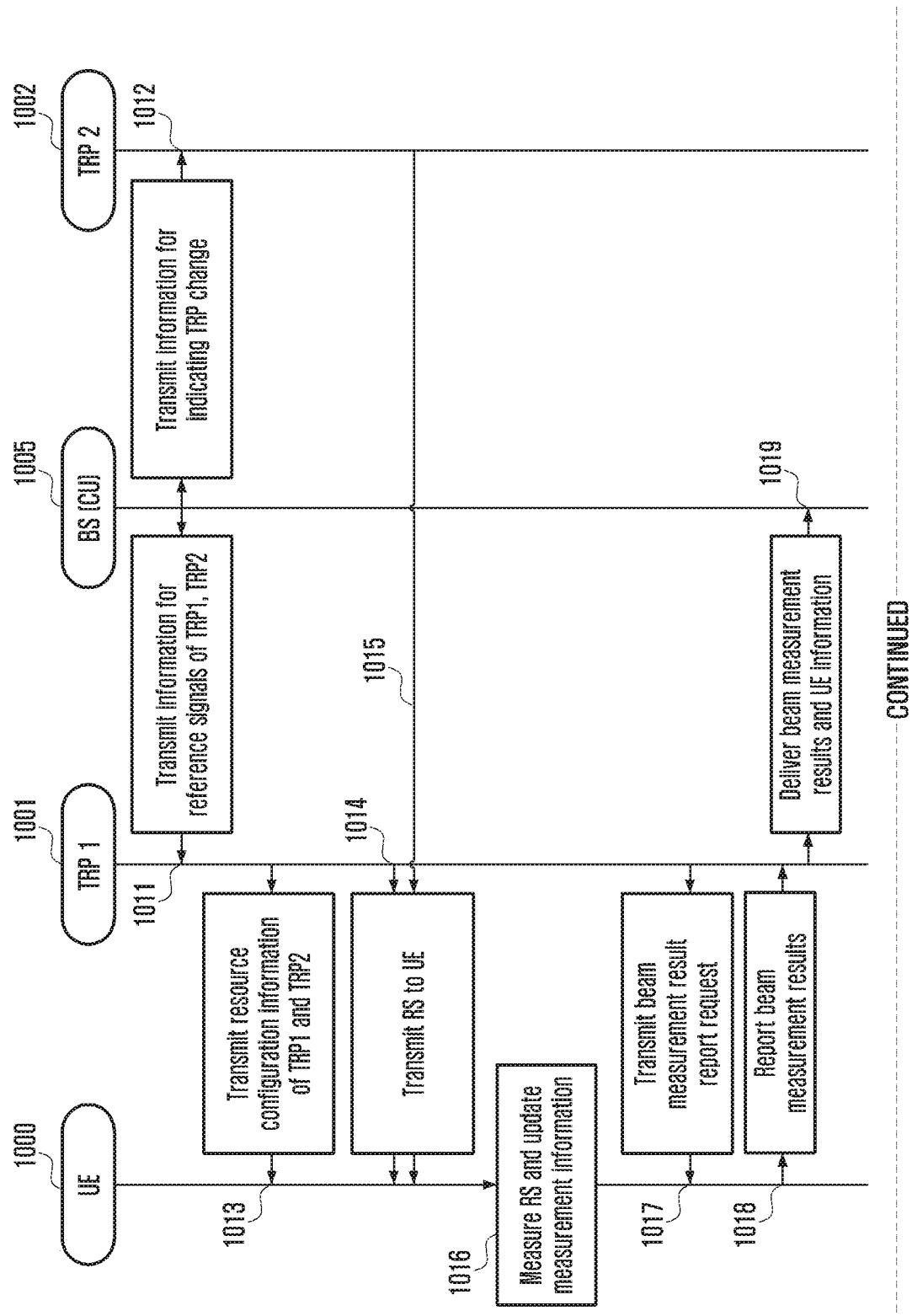
FIG. 10 is a diagram showing a procedure of changing a TRP after a grant in an embodiment of the disclosure.

FIG. 10 is a diagram showing a procedure of changing a TRP after a grant in an embodiment of the disclosure.

Referring to FIG. 10, a system may include a UE 1000, a TRP 1 1001, a TRP 2 1002 and a base station 1005. The UE 1000 is a UE belonging to the base station 1005, and exchanges information with the base station using the TRP1 1001.

Operation 1011 to operation 1023 of FIG. 10 correspond to the contents of operation 911 to operation 923 of FIG. 9. For them, reference is made to the related contents of FIG. 9.

At operation 1023, the base station 1005 transmits information for requesting (e.g., TRP change indication information) a TRP change operation to the TRP1 1001. At operation 1024, the TRP1 1001 transmits UE information to the central unit of the base station 1005. If all the contents have been previously included in the measurement report at operation 1019, operation 1024 is an operation that may be omitted. At operation 1024 or operation 1019, the UE information that may be transmitted may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

Operation 1025 is an operation for the base station 1005 to prepare the TRP2 1002 for the joining of the UE 1000, and is an operation that may be omitted if the TRP2 1002 includes only a simple RF stage or antenna. UE information that may be transmitted at operation 1025 may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

At operation 1026, the TRP2 1002 may transmit a response message for a TRP change request to the base station 1005. The TRP2 1002 may transmit information indicative of a TRP change grant or a TRP change denial.

At operation 1027, the base station 1005 may deliver a response message for a TRP change request to the TRP1 1001. The response message may include information for granting a TRP change or information for denying a TRP change depending on whether the TRP2 1002 grants a TRP change.

When information to grant a TRP change is received, at operation 1028, the TRP1 1001 transmits information for requesting (e.g., TRP change indication information) a TRP change operation to the UE 1000. The TRP change indication information (TRP change indication message) may be a physical layer message (PHY downlink control information), may be a MAC CE message, may be an IE included in an RRE message, for example, an RRC connection reconfiguration message.

Operation 1031 to operation 1033 of FIG. 10 correspond to operation 931 to operation 933 of FIG. 9. For them, reference is made to the description of FIG. 9.

Figure 11A:
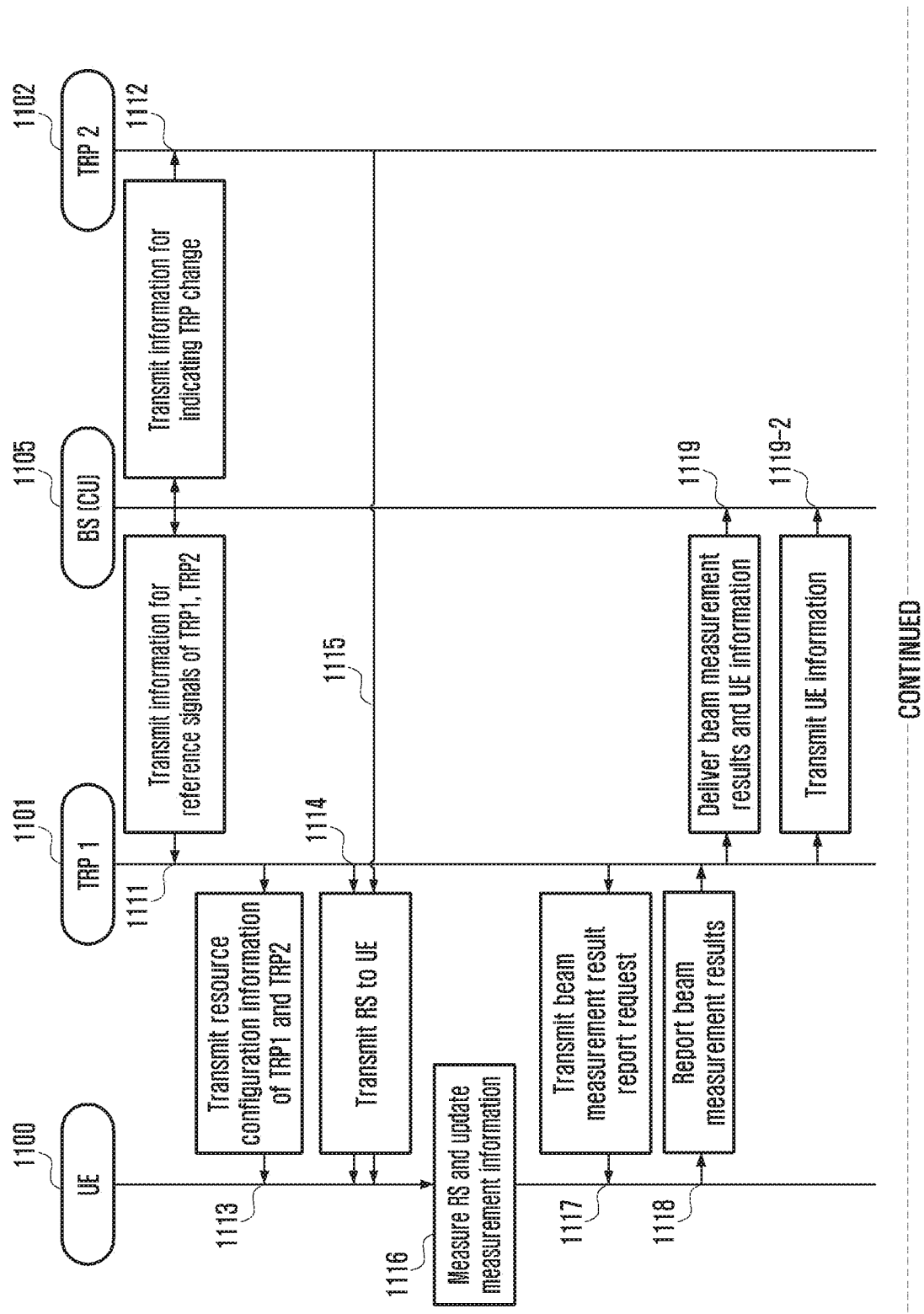
FIG. 11 is a diagram showing a procedure of changing a TRP after a grant in another embodiment of the disclosure.
Figure 11B:
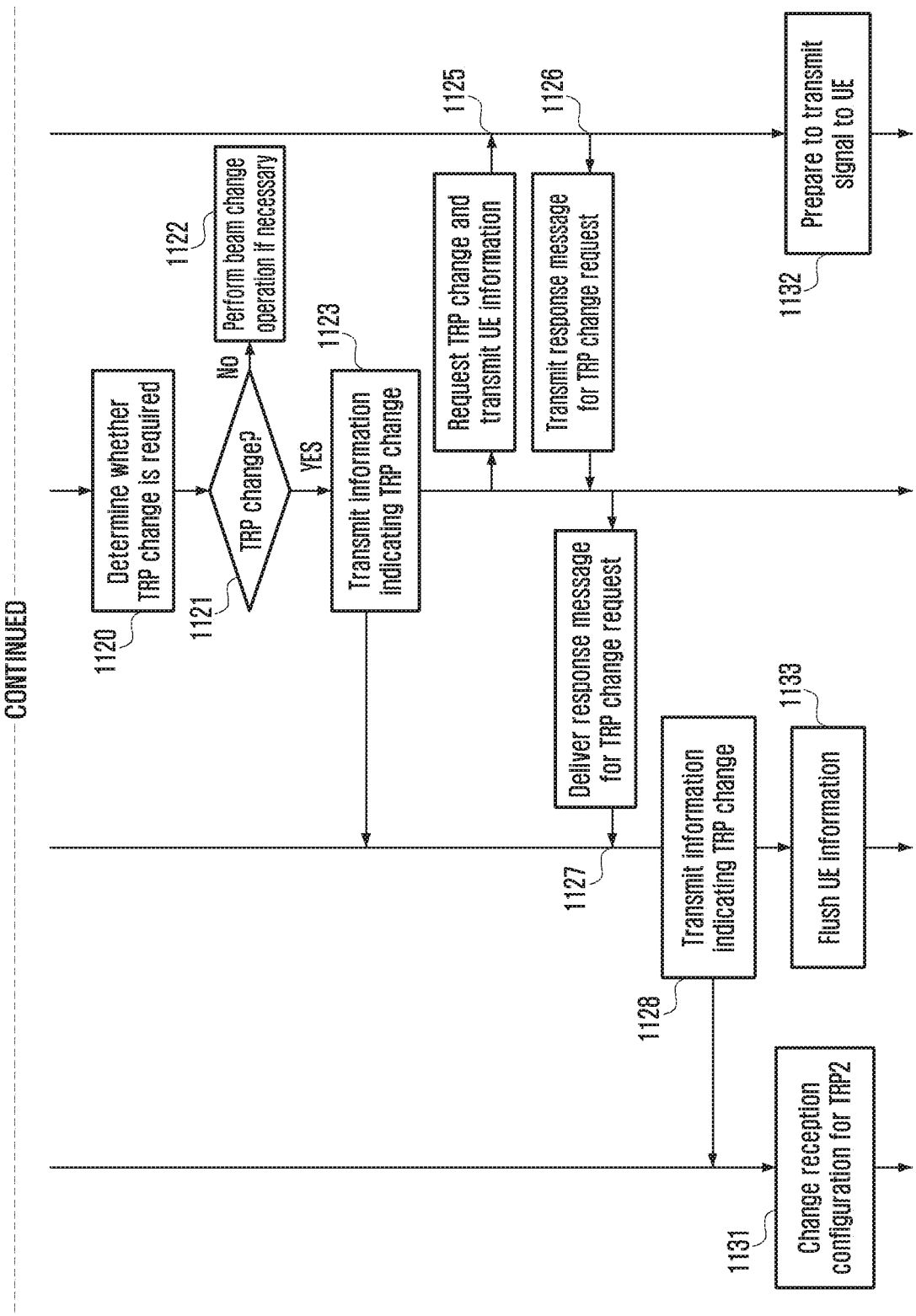

FIG. 11 is a diagram showing a procedure of changing a TRP after a grant in another embodiment of the disclosure.

Referring to FIG. 11, a system may include a UE 1100, a TRP 1 1101, a TRP 2 1102 and a base station 1105. The UE 1100 is a UE belonging to the base station 1105, and exchanges information with the base station using the TRP1 1101.

Operation 1111 to operation 1118 of FIG. 11 correspond to operation 1011 to operation 1018 of FIG. 10. For them, reference is made to the related contents of FIG. 10.

At operation 1119, the TRP1 1101 transmits feedback information, received from the UE 1100, to the base station 1105. The TRP1 1101 may transmit ID information of the UE and information on the best beam for each TRP or N beams having good performance for each TRP to the base station 1105.

At operation 1119-2, the TRP1 1101 transmits the UE information to the central unit of the base station 1105. If all the contents have been previously included in the measurement report at operation 1119, operation 1119-2 is an operation that may be omitted. UE information that may be transmitted at operation 1119 or operation 1119-2 may be some or all of the followings.

A UE ID, a UE best beam/CSI-RS/NR-SS ID, the best beam of the TRP 2 measured by the UE/CSI-RS/NR-SS ID and a measured value, MAC information, RLC information, TRP2 timing advance measurement information of the UE, etc.

Operation 1119 and Operation 1119-2 may be formed of one transmission operation.

Operation 1120 to operation 1123 of FIG. 11 correspond to operation 1020 to operation 1023 of FIG. 10. For them, reference is made to the related description of FIG. 10. In FIG. 11, an operation corresponding to operation 1024 of FIG. 10 has been omitted. An operation corresponding to operation 1024 has been performed at operation 1119-2.

Operation 1125 to operation 1133 of FIG. 11 correspond to operation 1025 to operation 1033 of FIG. 10. For them, reference is made to the related operations of FIG. 10.

Figure 12A:
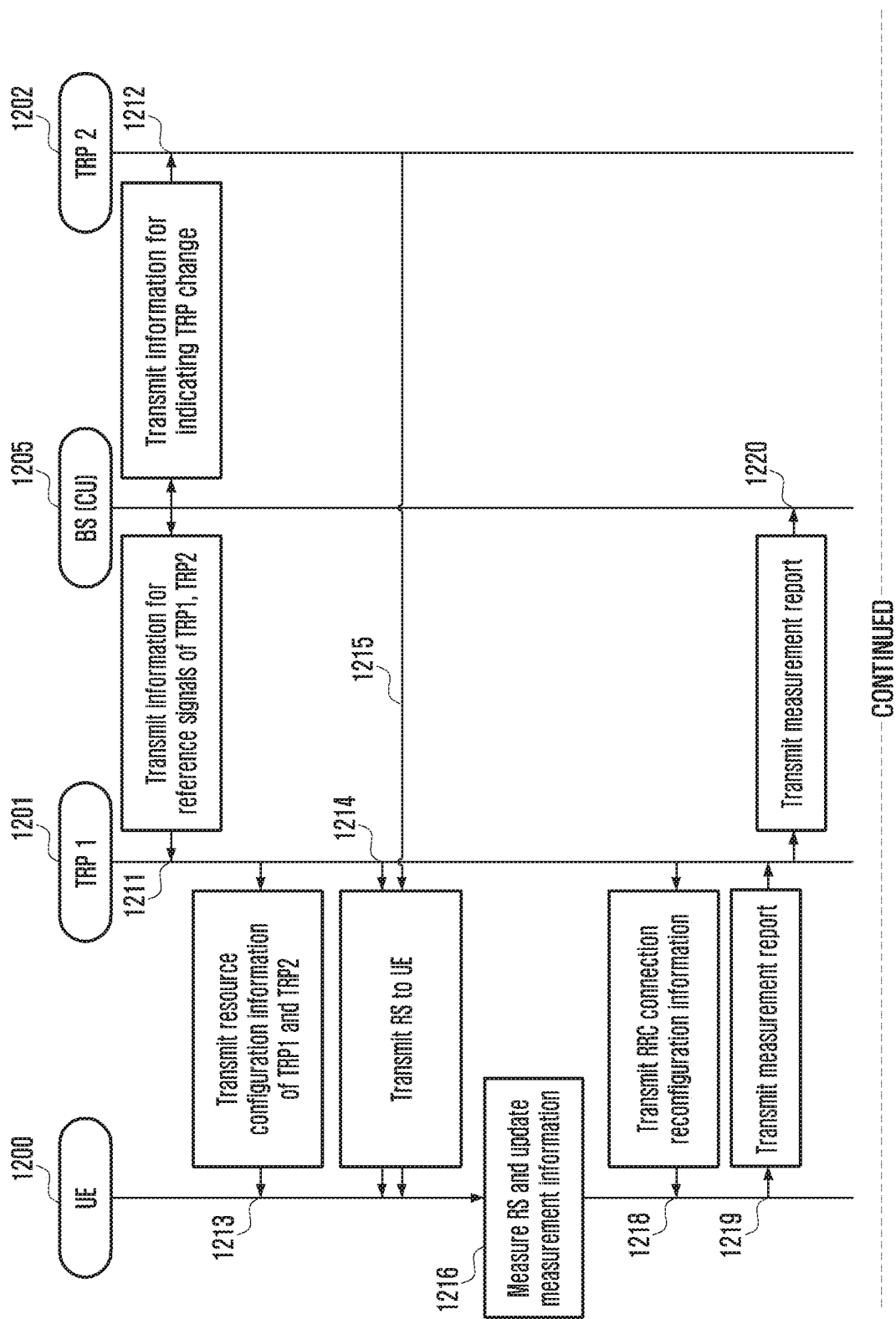
FIG. 12 is a diagram showing a procedure of changing a TRP based on an RRC message in another embodiment of the disclosure.
Figure 12B:
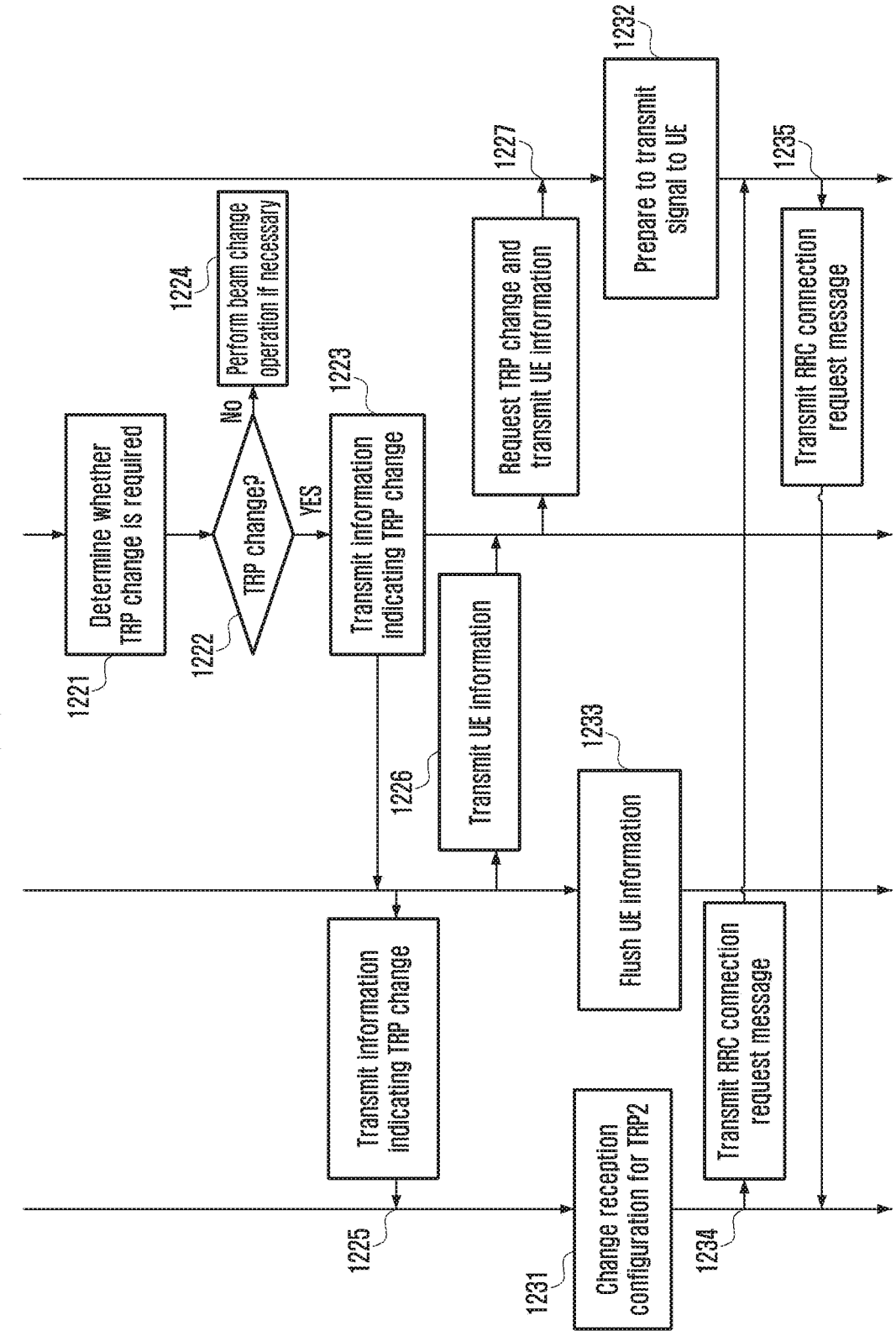

FIG. 12 is a diagram showing a procedure of changing a TRP based on an RRC message in another embodiment of the disclosure.

Referring to FIG. 12, a system may include a UE 1200, a TRP 1 1201, a TRP 2 1202 and a base station 1205. The UE 1200 is a UE belonging to the base station 1205, and exchanges information with the base station using the TRP1 1201.

Operation 1211 to operation 1233 of FIG. 12 correspond to operation 711 to operation 733 of FIG. 7. For them, reference is made to the related contents of FIG. 7.

At operation 1234, the UE 1200 transmits an RRC connection request message to the TRP2 1202. That is, the UE 1200 receives TRP change indication information from the base station 1205 or the TRP1 1201, and transmits the RRC connection request message to a TRP (TRP2 1202 in the embodiment of FIG. 12) for which a TRP change has been indicated in response thereto.

At operation 1235, the TRP2 1202 transmits an RRC connection response message to the UE 1200 in response to the reception of the RRC connection request. A TRP change using the RRC message may be performed depending on operation 1234 and operation 1235.

<Information Exchange Method Between TRP-CU>

1. A TRP may exchange and share UE information (MAC context, RLC context, timer information, buffer information, . . . ) with a CU and other TRPs in real time.

A. Information sharing between TRPs may be performed through a CU using an interface between the CU and the TRP.

B. Information sharing between TRPs may be performed using an interface between TRPs directly connected between the TRPs.

2. A CU may receive UE information from one TRP and manage the UE information, and may share it with other TRPs when the TRPs require the UE information (when a TRP change is necessary).

Figure 13:
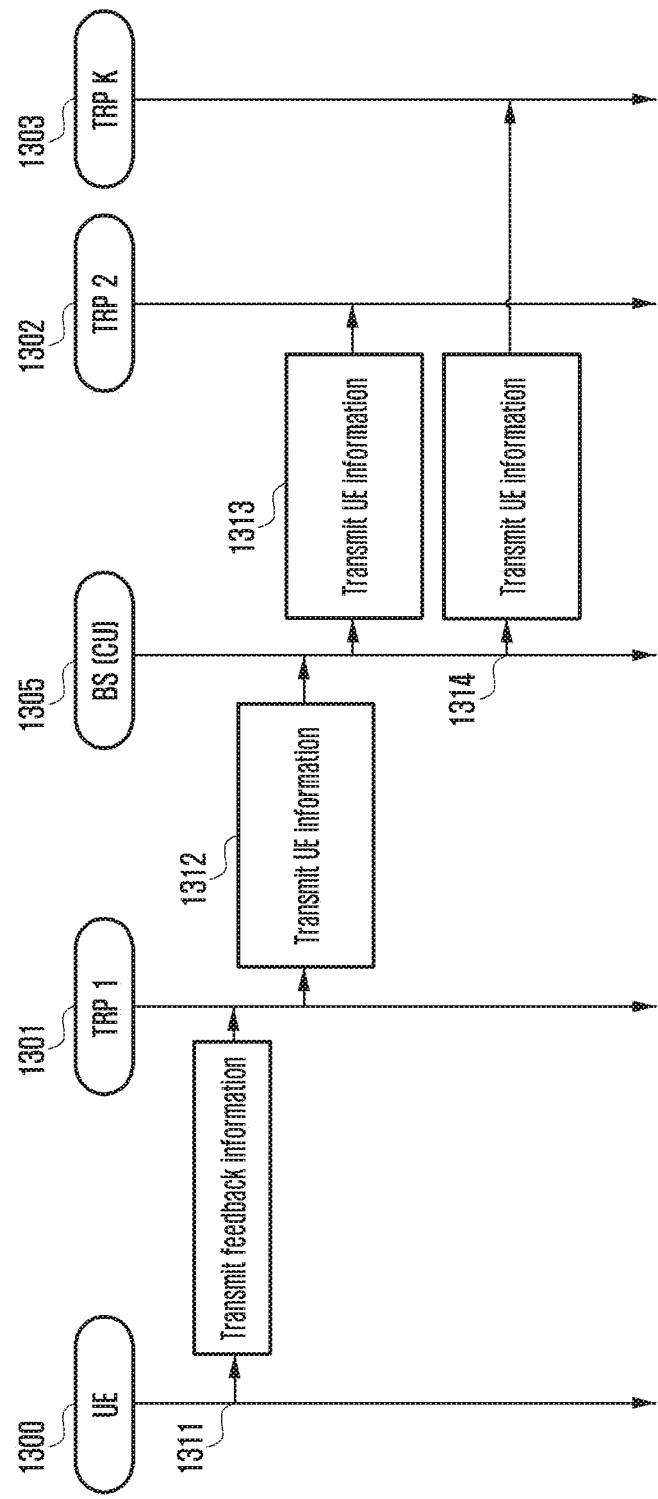
FIG. 13 is a diagram showing a method of exchanging terminal information between a TRP and a base station according to an embodiment of the disclosure.

FIG. 13 is a diagram showing a method of exchanging UE information between a TRP and a base station according to an embodiment of the disclosure.

Referring to FIG. 13, a system may include a UE 1300, a TRP1 1301, a TRP2 1302, a TRP k 1303, and a base station 1305. The UE 1300 is a UE belonging to the base station 1305, and exchanges information with the base station 1305 using the TRP1 1301.

At operation 1311, the UE 1300 transmits feedback information to the TRP1 1301. The feedback information may include TRP information, beam information, RACH information, SR information, etc. Furthermore, the feedback information may include UE information (MAC context, RLC context, timer information, buffer information, . . . ).

At operation 1312, the TRP1 1301 may transmit UE information to the base station 1305. The UE information may be UE context information. The UE information may include MAC context, RLC context, timer information, buffer information, . . . .

At operation 1313, the base station 1305 may transmit the UE information, received from the TRP1 1301, to the TRP2 1302. At operation 1314, the base station 1305 may transmit the UE information, received from the TRP1 1301, to the TRP k 1303.

As described above, UE information may be delivered to another TRP using an interface between the base station 1305 and the TRP.

Figure 14:
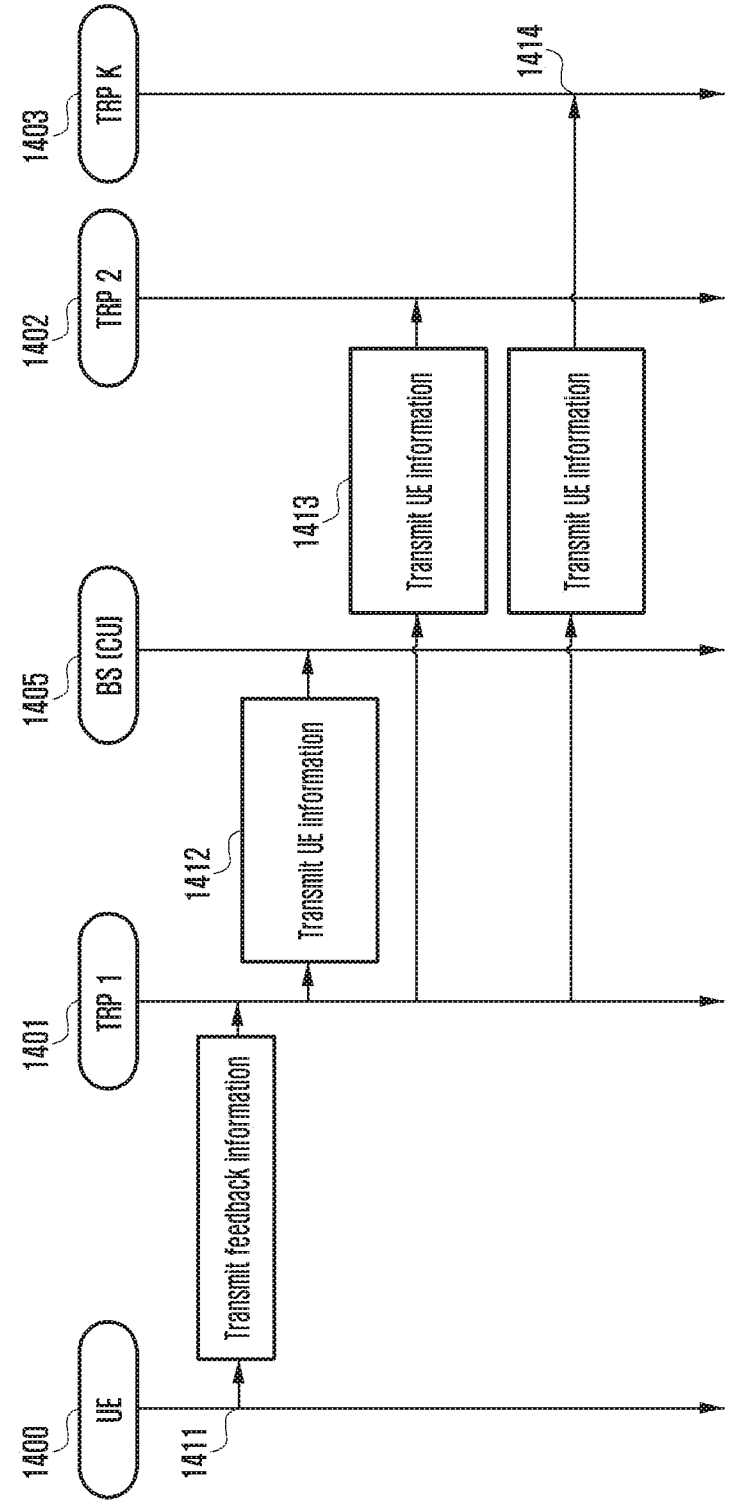
FIG. 14 is a diagram showing a method of exchanging terminal information between a TRP and a base station according to another embodiment of the disclosure.

FIG. 14 is a diagram showing a method of exchanging UE information between a TRP and a base station according to another embodiment of the disclosure.

Referring to FIG. 14, a system may include a UE 1400, a TRP1 1401, a TRP2 1402, a TRP k 1403, and a base station 1405. The UE 1400 is a UE belonging to the base station 1405, and exchanges information with the base station 1405 using the TRP1 1401.

At operation 1411, the UE 1400 transmits feedback information to the TRP1 1401. The feedback information may include TRP information, beam information, RACH information, SR information, etc. Furthermore, the feedback information may include UE information (MAC context, RLC context, timer information, buffer information, . . . ).

At operation 1412, the TRP1 1401 may transmit UE information to the base station 1405. The UE information may be UE context information. The UE information may include MAC context, RLC context, timer information, buffer information, . . . .

At operation 1413, the TRP1 1401 may transmit the UE information to the TRP2 1402. At operation 1414, the TRP1 1401 may transmit the UE information to the TRP k 1403.

As described above, information sharing between TRPs may be performed using an interface between TRPs directly connected between the TRPs.

Figure 15:
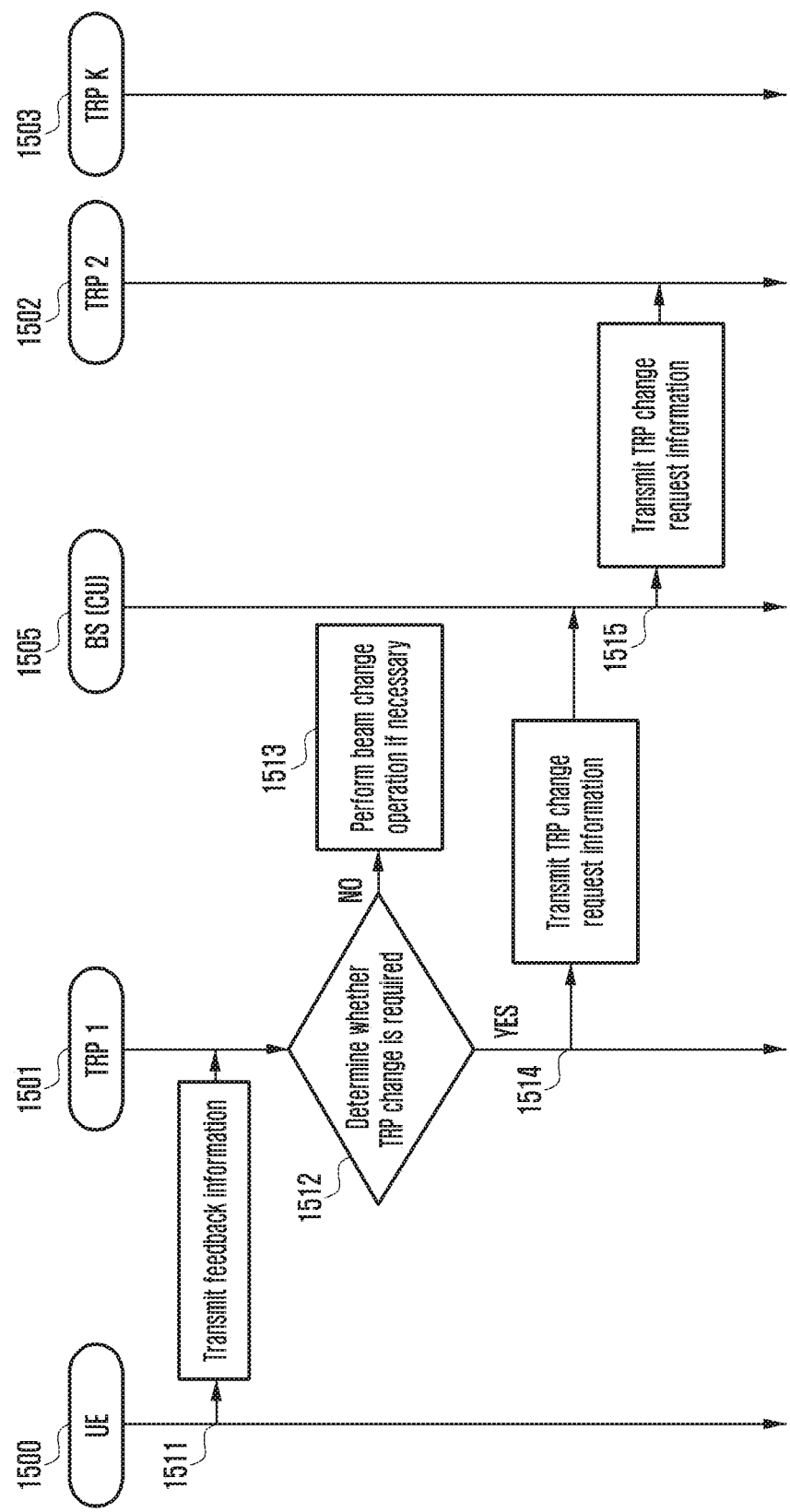
FIG. 15 is a diagram showing a method of sharing terminal information when a TRP change is requested in an embodiment of the disclosure.

FIG. 15 is a diagram showing a method of sharing UE information when a TRP change is requested in an embodiment of the disclosure.

Referring to FIG. 15, a system may include a UE 1500, a TRP1 1501, a TRP2 1502, a TRP k 1503, and a base station 1505. The UE 1500 is a UE belonging to the base station 1505, and exchanges information with the base station 1505 using the TRP1 1501.

At operation 1511, the UE 1500 transmits feedback information to the TRP1 1501. The feedback information may include TRP information, beam information, RACH information, SR information, etc. Furthermore, the feedback information may include UE information (MAC context, RLC context, timer information, buffer information, . . . ).

At operation 1512, the TRP1 1501 determines whether a TRP change is required. For a method of determining a TRP change, reference is made to the determination methods described in the previous embodiments.

If a TRP change is not required, at operation 1513, the TRP1 1501 does not need to provide the UE 1500 with any information related to a TRP change. However, even in such a case, the UE 1500 may need to change a beam being used within the same TRP. In such a case, the TRP1 1501 or the base station 1505 may enable the UE 1500 to perform a beam change.

At operation 1514, the TRP1 1501 transmits information for requesting a TRP change operation to the base station 1505. The information for requesting (e.g., TRP change indication information) a TRP change operation may be a physical layer message (PHY downlink control information), may be a MAC CE message, may be an IE included in an RRE message, for example, an RRC connection reconfiguration message. For the contents of information that may be included in the TRP change indication information, reference is made to the embodiment of FIG. 7.

At operation 1515, the base station 1505 transmits the information for requesting a TRP change operation to the TRP 2 1502, that is, the subject of a TRP change. In the embodiment, the base station 1505 transmits the information for requesting a TRP change operation to the TRP2 1502 because it is assumed that a TRP for the UE 1500 is changed from the TRP1 1501 to the TRP2 1502.

Figure 16:
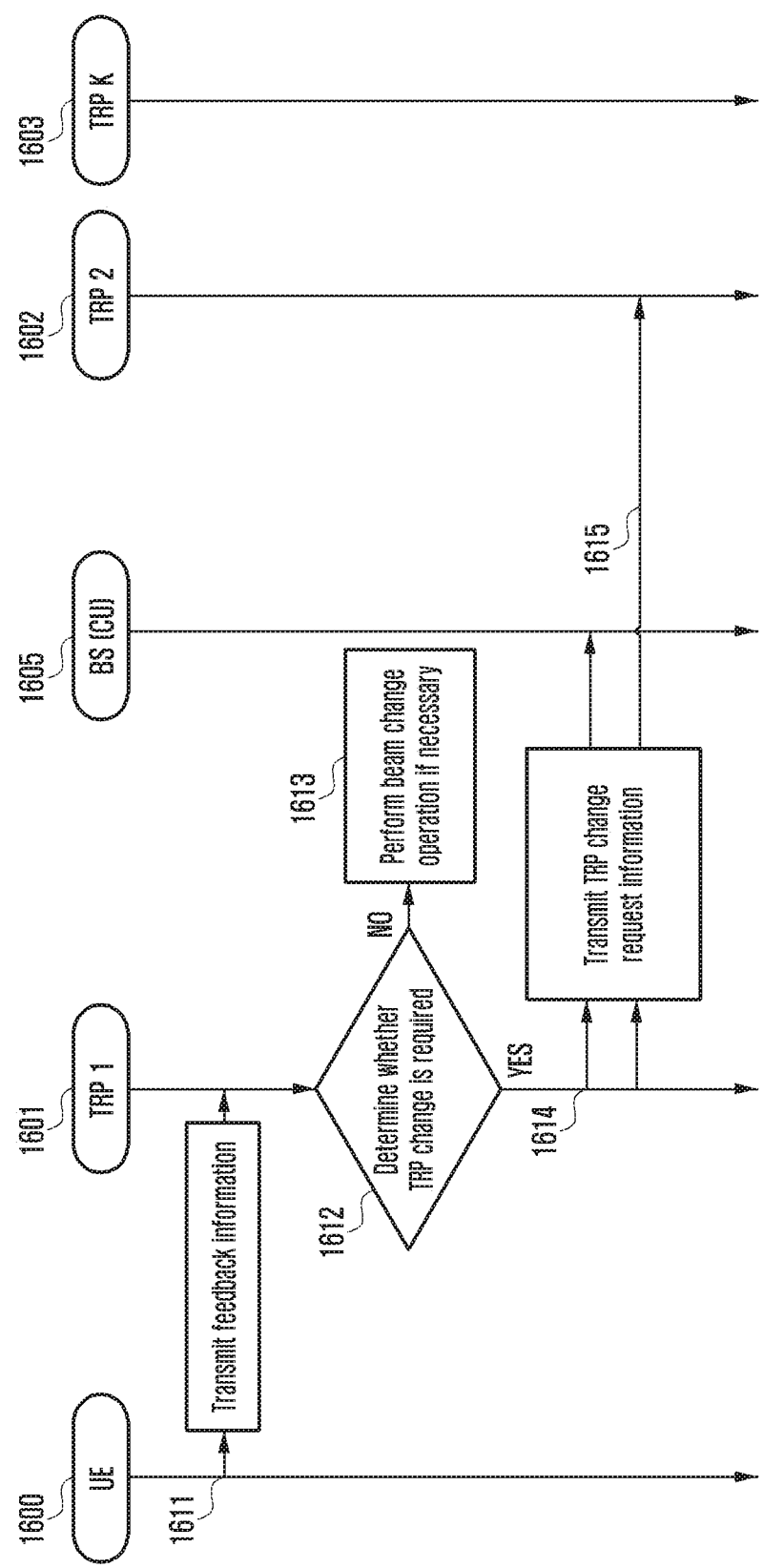
FIG. 16 is a diagram showing a method of sharing terminal information when a TRP change is requested in another embodiment of the disclosure.

FIG. 16 is a diagram showing a method of sharing UE information when a TRP change is requested in another embodiment of the disclosure.

Referring to FIG. 16, a system may include a UE 1600, a TRP1 1601, a TRP2 1602, a TRP k 1603, and a base station 1605. The UE 1600 is a UE belonging to the base station 1605, and exchanges information with the base station 1605 using the TRP1 1601.

At operation 1611, the UE 1600 transmits feedback information to the TRP1 1601. The feedback information may include TRP information, beam information, RACH information, SR information, etc. Furthermore, the feedback information may include UE information (MAC context, RLC context, timer information, buffer information, . . . ).

At operation 1612, the TRP1 1601 determines whether a TRP change is required. For a method of determining a TRP change, reference is made to the determination methods described in the previous embodiments.

If a TRP change is not required, at operation 1613, the TRP1 1601 does not need to provide the UE 1600 with any information related to a TRP change. However, even in such a case, the UE 1600 may need to change a beam being used within the same TRP. In such a case, the TRP1 1601 or the base station 1605 may enable the UE 1600 to perform a beam change.

At operation 1614, the TRP1 1601 transmits information for requesting a TRP change operation to the base station 1605. The information (e.g., TRP change indication information) for requesting a TRP change operation may be a physical layer message (PHY downlink control information), may be a MAC CE message, may be an IE included in an RRE message, for example, an RRC connection reconfiguration message. For the contents of information that may be included in the TRP change indication information, reference is made to the embodiment of FIG. 7.

At operation 1615, the TRP1 1601 transmits the information for requesting a TRP change operation to the TRP 2 1602, that is, the subject of a TRP change. In the embodiment, the TRP1 1601 transmits the information for requesting a TRP change operation to the TRP2 1602 because it is assumed that a TRP for the UE 1600 is changed from the TRP1 1601 to the TRP2 1602.

Figure 17:
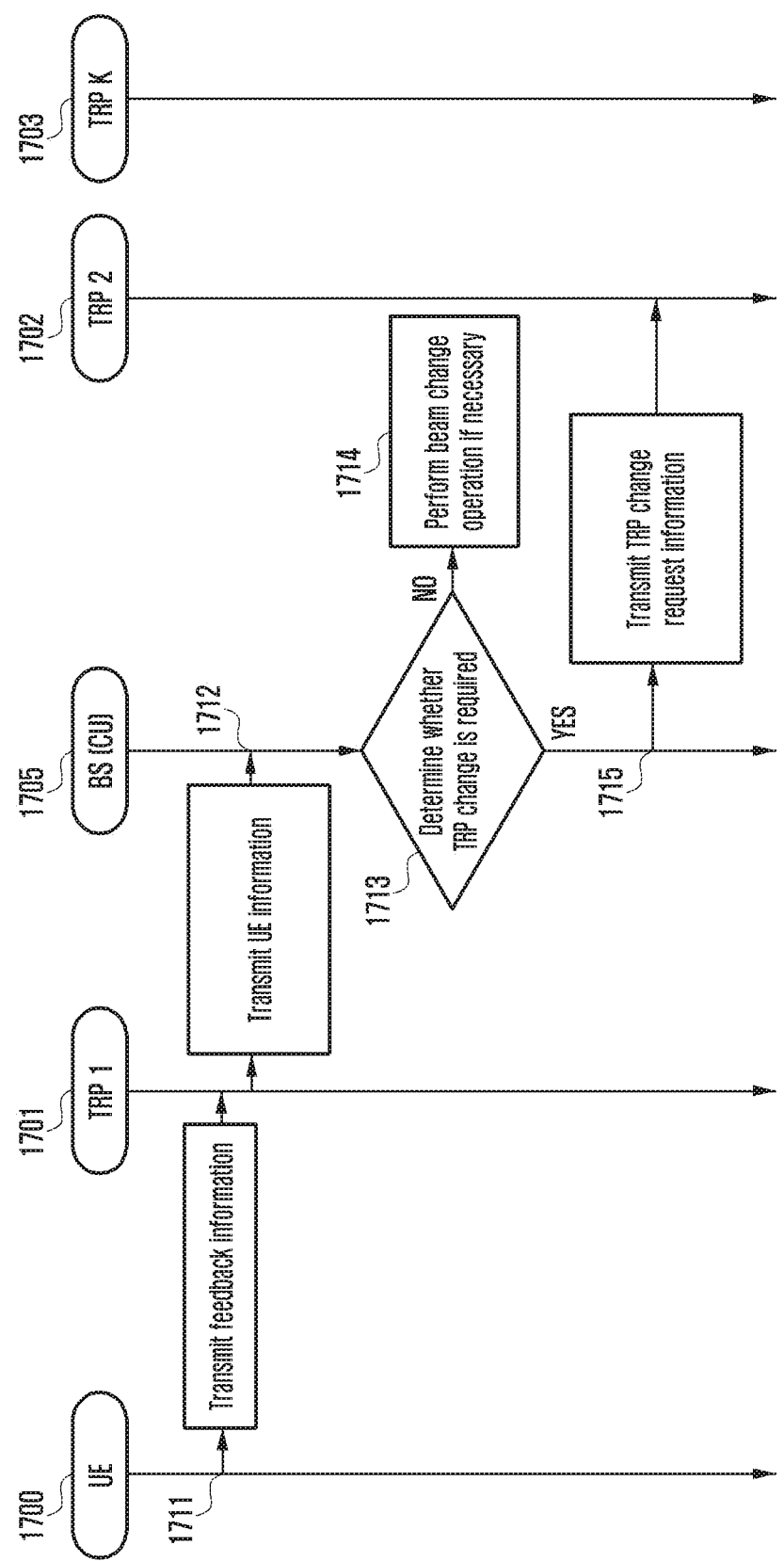
FIG. 17 is a diagram showing a method of sharing terminal information when a TRP change is requested in another embodiment of the disclosure.

FIG. 17 is a diagram showing a method of sharing UE information when a TRP change is requested in another embodiment of the disclosure.

Referring to FIG. 17, a system may include a UE 1700, a TRP1 1701, a TRP2 1702, a TRP k 1703, and a base station 1705. The UE 1700 is a UE belonging to the base station 1705, and exchanges information with the base station 1705 using the TRP1 1701.

At operation 1711, the UE 1700 transmits feedback information to the TRP1 1701. The feedback information may include TRP information, beam information, RACH information, SR information, etc. Furthermore, the feedback information may include UE information (MAC context, RLC context, timer information, buffer information, . . . ).

At operation 1712, the TRP1 1701 may transmit UE information to the base station 1705. The UE information may be UE context information. The UE information may include MAC context, RLC context, timer information, buffer information, . . . .

At operation 1713, the base station 1705 determines whether a TRP change is required. For a method of determining a TRP change, reference is made to the determination methods described in the previous embodiments.

If a TRP change is not required, at operation 1714, the base station 1705 does not need to provide the UE 1700 with any information related to a TRP change. However, even in such a case, the UE 1700 may need to change a beam being used within the same TRP. In such a case, the base station 1705 may enable the UE 1700 to perform a beam change.

If a TRP change is required, at operation 1715, the base station 1705 transmits information for requesting a TRP change operation to the TRP2 1602. The information (e.g., TRP change indication information) for requesting a TRP change operation may be a physical layer message (PHY downlink control information), may be a MAC CE message, may be an IE included in an RRE message, for example, an RRC connection reconfiguration message. For the contents of information that may be included in the TRP change indication information, reference is made to the embodiment of FIG. 7.

Figure 18A:
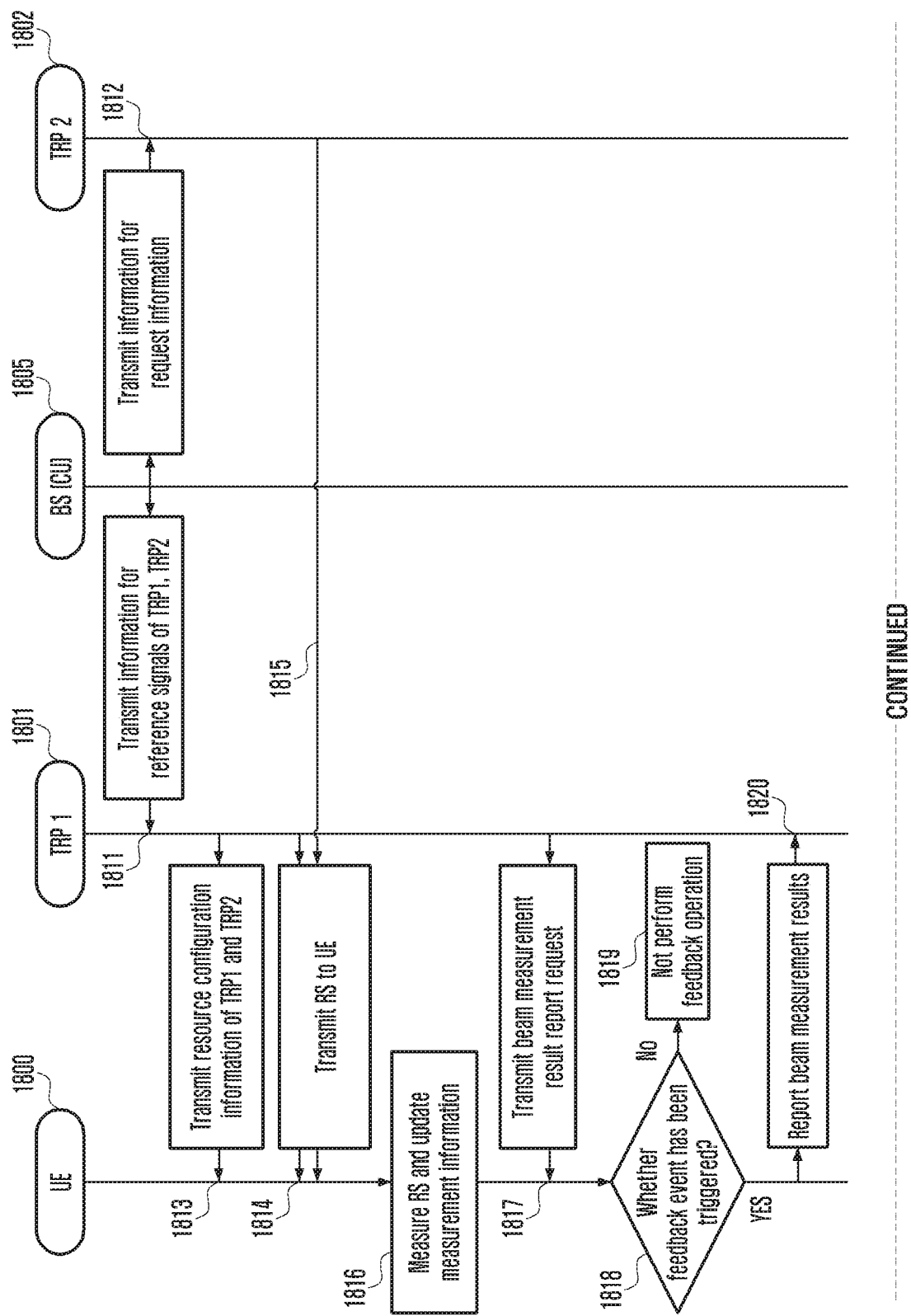
FIG. 18 is a diagram showing a terminal feedback trigger and TRP change method according to an event in an embodiment of the disclosure.
Figure 18B:
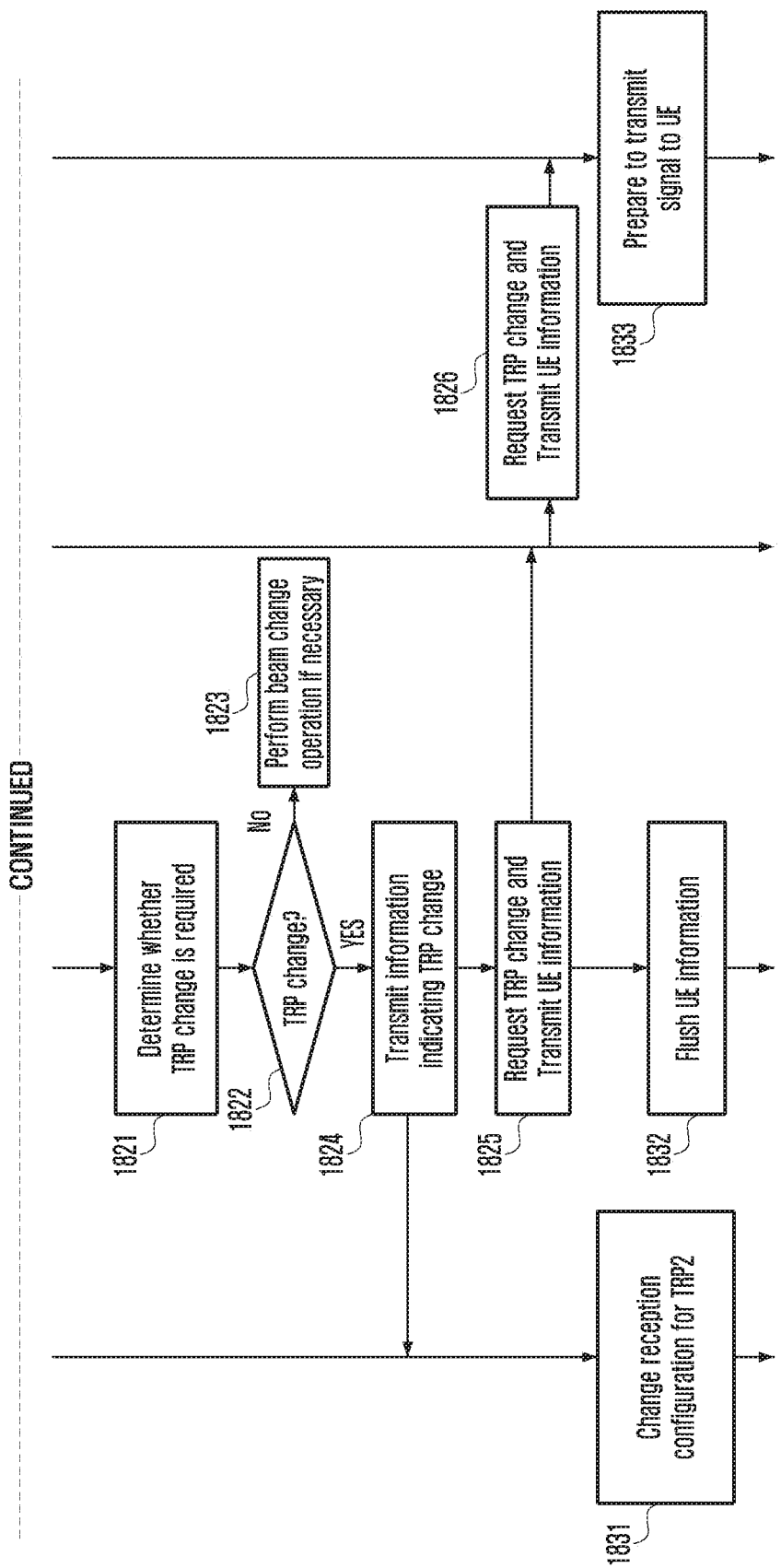

FIG. 18 is a diagram showing a UE feedback trigger and TRP change method according to an event in an embodiment of the disclosure.

Referring to FIG. 18, a system may include a UE 1800, a TRP 1 1801, a TRP 2 1802 and a base station 1805.

The UE 1800 is a UE 1800 belonging to the base station 1805, and exchanges information with the base station using the TRP1 1801.

At operation 1811 and operation 1812, the base station 1805 selects RSs to be transmitted by the TRP1 1801 and the TRP2 1802 and the resources of the corresponding RSs so that the UE 1800 can measure the TRPs, and delivers such information to the TRP1 1801 and the TRP2 1802 if the information needs to be provided to the TRPs. In this case, the TRP1 1801 has to schedule RS information of the TRP2 1802 in addition to the RS of the TRP1 1801 with respect to the UE 1800. Accordingly, the base station 1805 may provide the TRP1 1801 with both RS configuration information of the TRP1 1801 and configuration information of the TRP2 1802.

At operation 1813, the TRP1 1801 provides the UE 1800 with the configured resource configuration information of the TRP1 1801 and the TRP2 1802 so that the UE 1800 can measure each of the TRPs. In this case, the TRP 1 1801 may provide a direct TRP ID associated with resource configuration information of a different TRP or any resource segmentation method of enabling the UE to indirectly distinguish between the TRPs, for example, a method of transmitting the RSs of different TRPs at time intervals may be used so that the UE 1800 can recognize that the corresponding RSs are transmitted by different TRPs.

At operation 1814, the TRP1 1801 transmits the RS to the UE 1800, as allocated, for measurement. At operation 1815, the TRP2 1802 transmits the RS to the UE 1800, as allocated, for measurement.

At operation 1816, the UE 1800 performs RS measurement on different TRPs, and updates measurement information for filtering purposes, for example, if necessary.

At operation 1817, the TRP1 1801 may indicate that beam measurement results should be reported. The TRP 1 1801 may indicate that the best beam or N beams having good performance should be reported for each TRP. The beam measurement result report information may indicate that information on a TRP ID, a beam ID, beam quality should be reported.

At operation 1818, the UE 1800 checks whether a feedback event has been triggered. If a feedback event has not been triggered, at operation 1819, the UE 1800 does not perform an operation for feedback. If a feedback event has been triggered, at operation 1820, the UE 1800 transmits feedback information to the TRP1 1801. The information may be transmitted using a pre-scheduled resource, RACH resource, SR resource, other possible resource, etc.

At operation 1821, the TRP1 1801 may determine whether a TRP change is required. The TRP1 1801 may determine whether a TRP change is required based on reported measurement results. For example, if the measurement results of the reference signal of the TRP2 is greater than the measurement results of the reference signal of the TRP1 by a value of a preset offset, the TRP1 1801 may determine that a TRP change is required.

If it is determined that a TRP change is not required at operation 1822, the process proceeds to operation 1823. If it is determined that a TRP change is required, the process proceeds to operation 1824.

At operation 1823, the TRP1 1801 does not need to provide the UE 1800 with any information related to a TRP change. However, even in such a case, the UE 1800 may need to change a beam being used within the same TRP. In such a case, the TRP1 1801 may enable the UE 1800 to perform a beam change.

At operation 1824, the TRP1 1801 transmits information (e.g., TRP change indication information) for requesting a TRP change operation to the UE 1800. At operation 1824, the TRP1 1801 transmits the information for requesting a TRP change operation to the UE 1800.

At operation 1825, the TRP1 1801 provides a TRP change request and UE information to the base station 1805. There is a need for a procedure of notifying the base station 1805 of information indicating that a TRP change is necessary because the TRP1 1801 has determined the TRP change. The information may include at least one of a UE ID, a UE best beam/CSI-RS/NR-SS ID, the best beam of the TRP 2 measured by the UE/CSI-RS/NR-SS ID and a measured value, MAC information, RLC information, or TRP2 timing advance measurement information of the UE.

At operation 1826, the base station 1805 may provide the TRP2 1802 with the TRP change request and UE information. The TRP2 1802 may prepare the joining of the UE based on the TRP change request and UE information.

At operation 1831, the UE 1800 prepares to receive information of a target TRP, the TRP 2 included in a corresponding TRP change request message over a fixed time after the TRP change request message is received or until a scheduled resource is received. The UE 1800 changes a reception configuration so that the reception beam of the UE is suitable for the reception of the downlink resource of the TRP2 included in the TRP change request message and a beam/CSI-RS/NR-SS having a beam association (QCL) relation with the corresponding resource.

At operation 1832, the TRP1 1801 flushes information on the UE 1800.

At operation 1833, the TRP2 1802 prepares to transmit a signal to a UE, included in the TRP change request message, over a fixed time after the TRP change request message is received.

Figure 19A:
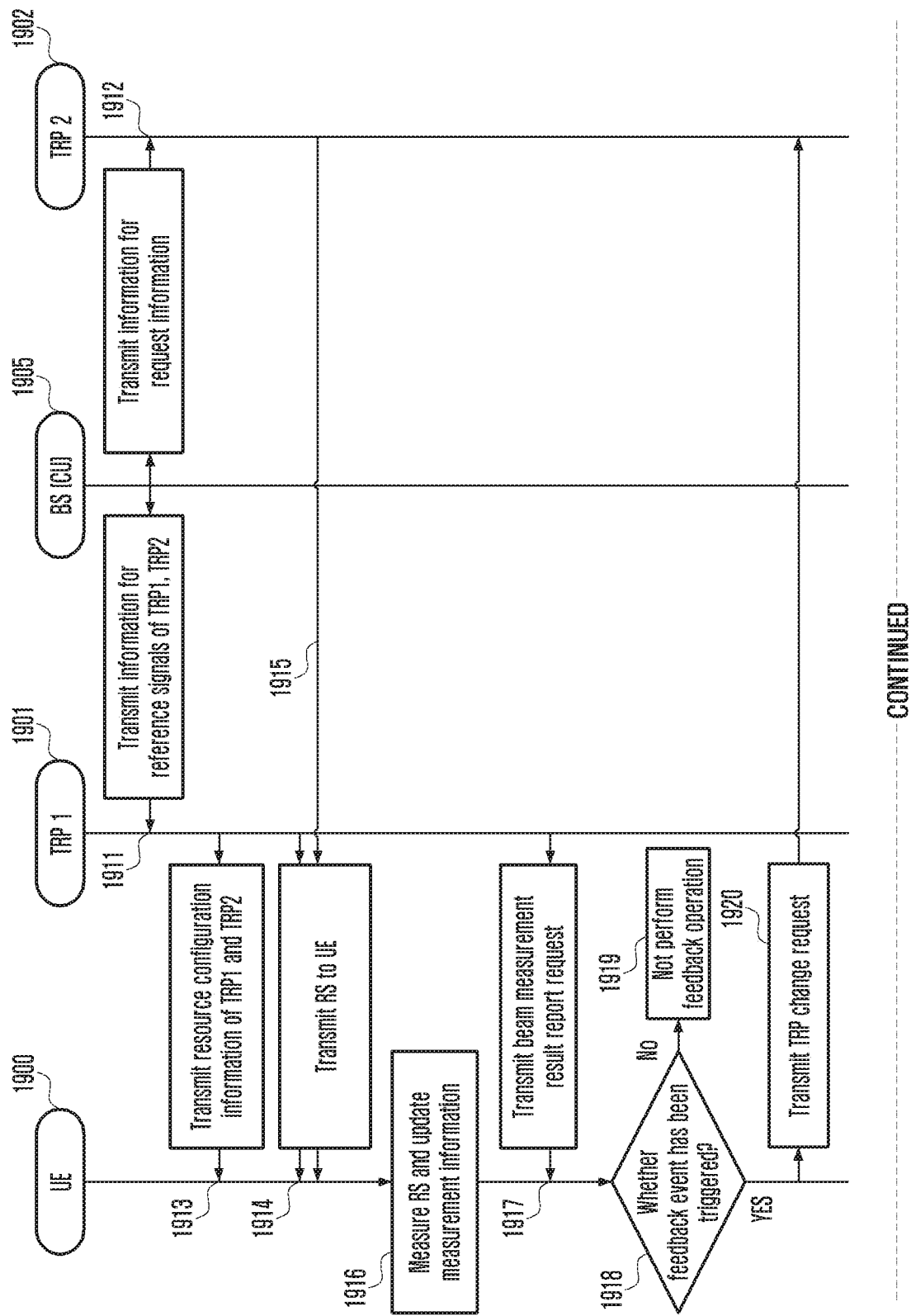
FIG. 19 is a diagram showing a terminal feedback trigger and TRP change method according to an event in another embodiment of the disclosure.
Figure 19B:
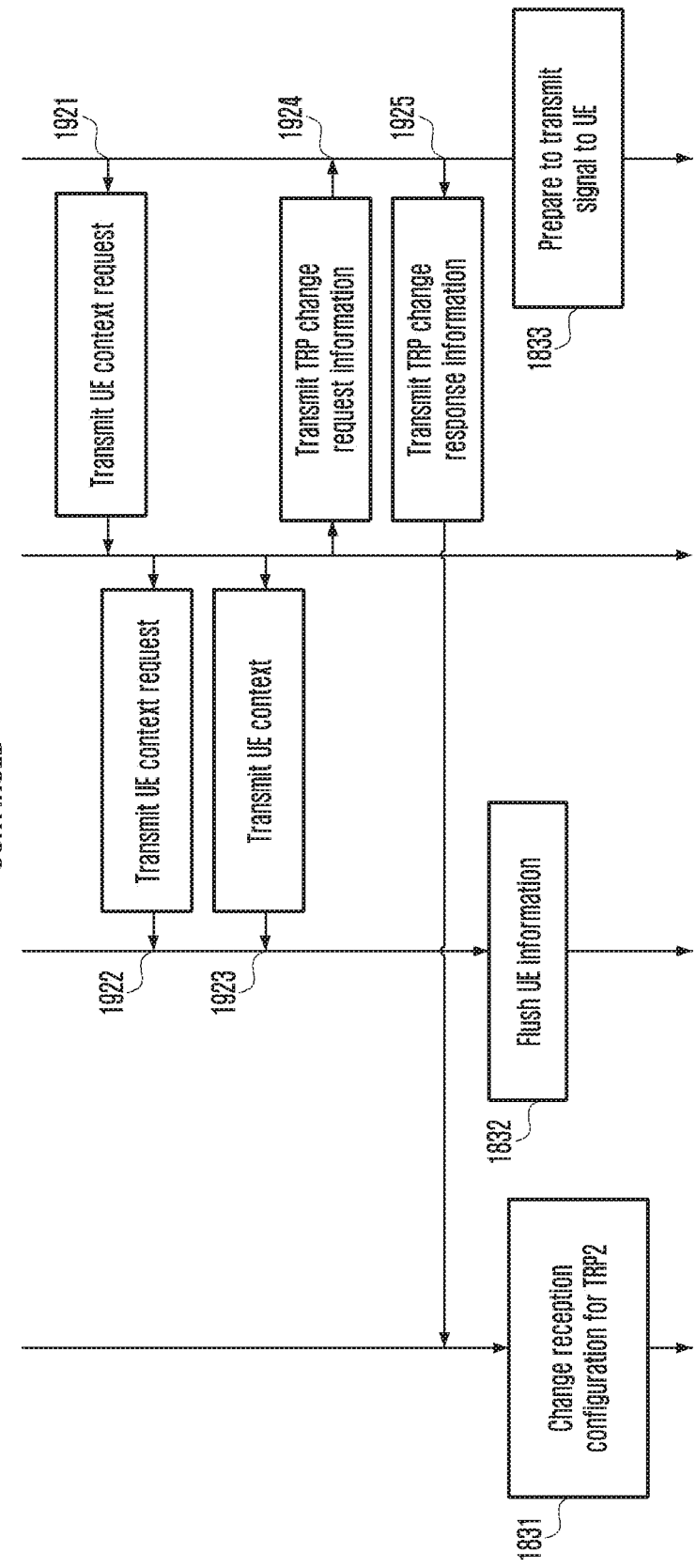

FIG. 19 is a diagram showing a terminal feedback trigger and TRP change method according to an event in another embodiment of the disclosure.

Referring to FIG. 19, a system may include a UE 1900, a TRP 1 1901, a TRP 2 1902 and a base station 1905. The UE 1900 is a UE 1900 belonging to the base station 1905, and exchanges information with the base station using the TRP1 1901.

Operation 1911 to operation 1917 of FIG. 19 correspond to operation 1811 to operation 1817 of FIG. 18. For them, reference is made to the related description of FIG. 18.

At operation 1918, the UE 1900 determines whether a TRP change event has been triggered. If a TRP change event has not been triggered, at operation 1919, the UE 1900 does not perform an operation for a TRP change.

If a TRP change event has been triggered, at operation 1920, the UE 1900 may transmit TRP change request information to the TRP2 1902. The UE 1900 may transmit at least one of a TRP change request, a TRP reallocation request, or a TRP reconfiguration request. The request of the UE 1900 may be transmitted through a common channel or an RACH channel or an allocated another uplink resource.

At operation 1921, the TRP2 1902 requests UE context from the base station 1905. At operation 1922, the base station 1905 requests the UE context from the TRP1 1901.

At operation 1923, the TRP1 1901 transmits the UE context to the base station 1905. The UE context may include beam information, best beam information, MAC context, RLC context, timer information, buffer information, etc.

At operation 1924, the base station 1905 may transmit TRP change request information to the TRP2 1902.

At operation 1925, the TRP2 1902 transmits TRP change response information to the UE 1900.

At operation 1931, the UE 1900 prepares to receive information of a target TRP, the TRP 2, included in the corresponding TRP change request message, over a fixed time after the TRP change request message is received or until a scheduled resource is received. The UE 1900 changes a reception configuration so that the reception beam of the UE is suitable for the reception of the downlink resource of the TRP2 included in the TRP change request message and a beam/CSI-RS/NR-SS having a beam association (QCL) relation with the corresponding resource.

At operation 1932, the TRP1 1901 flushes information on the UE 1800.

At operation 1933, the TRP2 1902 prepares to transmit a signal to a UE, included in the TRP change request message, over a fixed time after the TRP change request message is received.

Figure 20:
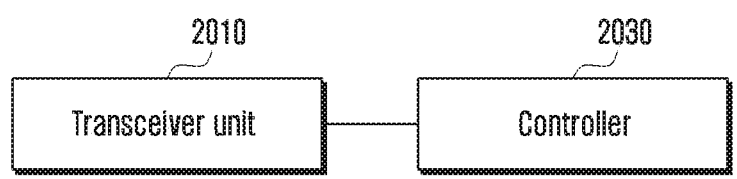
FIG. 20 is a diagram showing a terminal according to an embodiment of the disclosure.

FIG. 20 is a diagram showing a terminal according to an embodiment of the disclosure.

Referring to FIG. 20, the UE may include a transceiver 2010 and a controller 2030. The UE transmits and/or receives a signal, information, data, a message, etc. through the transceiver 2010. The controller 2030 may include at least one processor. The controller 2030 may control an overall operation of the UE.

In accordance with an embodiment of the disclosure, the controller 2030 may control to receive resource configuration information, including reference signal configuration information of a first TRP and reference signal configuration information of a second TRP, from a first transmission and reception point (TRP), to measure a reference signal corresponding to the first TRP and a reference signal corresponding to the second TRP based on the resource configuration information, to report the measurement information on the reference signal corresponding to the first TRP and the reference signal corresponding to the second TRP to the first TRP, to receive TRP change indication information from the first TRP, and to change a configuration for the second TRP based on the TRP change indication information. The TRP change indication information may be included in a medium access control (MAC) control element (CE) message. The TRP change indication information may include a channel state information-reference signal (CSI-RS) for the second TRP.

Furthermore, the controller 2030 may control to receive at least one of connection grant information, timing advance (TA) information or random access channel (RACH) request information from the TRP2.

An operation of the controller 2030 is not limited thereto. In an embodiment of the disclosure, the controller 2030 may control the operation of the UE described through the embodiments of FIGS. 1 to 19 of the disclosure.

Figure 21:
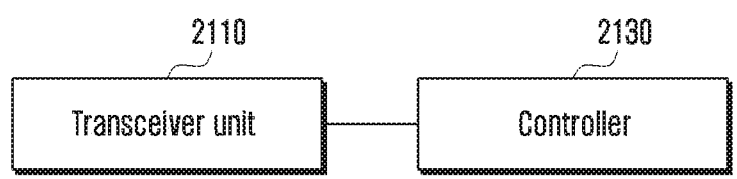
FIG. 21 is a diagram showing a base station according to an embodiment of the disclosure.

FIG. 21 is a diagram showing a base station according to an embodiment of the disclosure.

Referring to FIG. 21, the base station may include a transceiver 2110 and a controller 2130. The transceiver 2110 of the base station may be a concept including at least one TRP and or at least one antenna. The controller 2130 of the base station may be a concept including at least one CU and at least one DU. The base station may transmit and/or receive a signal, information, data, a message, etc. through the transceiver 2110. The controller 2130 may include at least one processor. The controller 2130 may control an overall operation of the base station.

In accordance with an embodiment of the disclosure, the transceiver 2110 includes a first transmission and reception point (TRP) and a second TRP. The controller 2130 may perform control to transmit resource configuration information including reference signal configuration information of the first TRP and reference signal configuration information of the second TRP, to receive measurement report information transmitted by a UE, to determine whether the transceiver 2110 transmitting and receiving information to and from the UE will be changed from the first TRP to the second TRP, to transmit TRP change indication information to the UE using the first TRP, to provide additional information enabling the UE to easily access the second TRP if necessary, and to resume communication with the UE through the second TRP. The TRP change indication information may be included in a medium access control (MAC) control element (CE) message. The TRP change indication information may include a channel state information-reference signal (CSI-RS) for the second TRP.

Furthermore, the controller 2130 may control to transmit at least one of connection grant information, timing advance (TA) information or random access channel (RACH) request information from the TRP2 to the UE using the TRP1.

An operation of the controller 2130 is not limited thereto. In an embodiment of the disclosure, the controller 2130 may control the operations of the base station described through the embodiments of FIGS. 1 to 19 of the disclosure.

Furthermore, the embodiments disclosed in the specification and drawings have proposed only specific examples in order to easily describe the contents of the disclosure and help understanding of the disclosure, and are not intended to restrict the scope of the disclosure. Accordingly, the scope of the disclosure should be construed as including all the changes or modified forms derived based on the technical spirit of the disclosure in addition to the disclosed embodiments.

The invention claimed is:

1. A method performed by a terminal, comprising:
   receiving, from a first transmission and reception point (TRP), resource configuration information, comprising reference signal configuration information on the first TRP of a base station and reference signal configuration information on a second TRP of the base station;
   measuring a reference signal corresponding to the first TRP and a reference signal corresponding to the second TRP based on the resource configuration information;
   reporting, to the first TRP, measurement information on the reference signal corresponding to the first TRP and the reference signal corresponding to the second TRP;
   receiving, from the first TRP, TRP change indication information including a beam identity of the second TRP and quasi-co-location (QCL) information associated with the beam; and
   changing a configuration for receiving downlink information from the second TRP based on the TRP change indication information.

2. The method of claim 1, wherein the TRP change indication information is included in a medium access control (MAC) control element (CE) message.

3. The method of claim 1, wherein the TRP change indication information includes a channel state information - reference signal (CSI-RS) for the second TRP.

4. The method of claim 1, further comprising receiving at least one of connection grant information, timing advance (TA) information or random access channel (RACH) request information from the second TRP.

5. A terminal, comprising:
   a transceiver; and
   a controller configured to:
      receive, from a first transmission and reception point (TRP) via the transceiver, resource configuration information, comprising reference signal configuration information on the first TRP of a base station and reference signal configuration information on a second TRP of the base station,
      measure a reference signal corresponding to the first TRP and a reference signal corresponding to the second TRP based on the resource configuration information, report, to the first TRP via the transceiver, measurement information on the reference signal corresponding to the first TRP and the reference signal corresponding to the second TRP,
      receive, from the first TRP via the transceiver, TRP change indication information including a beam identity of the second TRP and quasi-co-location (QCL) information associated with the beam, and
      change a configuration for receiving downlink information from the second TRP based on the TRP change indication information.

6. The terminal of claim 5, wherein the TRP change indication information is included in a medium access control (MAC) control element (CE) message.

7. The terminal of claim 5, wherein the TRP change indication information includes a channel state information - reference signal (CSI-RS) for the second TRP.

8. The terminal of claim 5, wherein the controller is configured to control to receive at least one of connection grant information, timing advance (TA) information or random access channel (RACH) request information from the second TRP.

9. A method performed by a base station, comprising:
   transmitting, to a terminal via a first transmission and reception point (TRP), resource configuration information comprising reference signal configuration information on the first TRP of the base station and reference signal configuration information on a second TRP of the base station;

transmitting, to the terminal, a reference signal corresponding to the first TRP and a reference signal corresponding to the second TRP based on the resource configuration information;

receiving, from the terminal, measurement information on the reference signal corresponding to the first TRP and the reference signal corresponding to the second TRP;

determining a TRP change for the terminal based on the measurement information;

transmitting, to the terminal via the first TRP, TRP change indication information including a beam identity of the second TRP and quasi-co-location (QCL) information associated with the beam; and changing a configuration for transmitting downlink data from the second TRP to the terminal based on the TRP change indication information.

10. The method of claim 9, wherein the TRP change indication information is included in a medium access control (MAC) control element (CE) message.

11. The method of claim 9, wherein the TRP change indication information includes a channel state information - reference signal (CSI-RS) for the second TRP.

12. The method of claim 9, further comprising transmitting at least one of connection grant information, timing advance (TA) information or random access channel (RACH) request information from the second TRP.

13. A base station, comprising:
a transceiver comprising a first transmission and reception point (TRP) and a second TRP; and
a controller configured to:
transmit, to a terminal via the first TRP, resource configuration information, comprising reference signal configuration information on the first TRP of the base station and reference signal configuration information on the second TRP of the base station,
transmit, via the transceiver, a reference signal corresponding to the first TRP and a reference signal corresponding to the second TRP based on the resource configuration information,
receive, from the terminal via the first TRP, measurement information on the reference signal corresponding to the first TRP and the reference signal corresponding to the second TRP,
determine a TRP change for the terminal based on the measurement information,
transmit, to the terminal via the first TRP, TRP change indication information including a beam identity of the second TRP and quasi-co-location (QCL) information associated with the beam, and
change a configuration for transmitting downlink data from the second TRP to the terminal based on the TRP change indication information.

14. The base station of claim 13, wherein the TRP change indication information is included in a medium access control (MAC) control element (CE) message.

15. The base station of claim 13, wherein the TRP change indication information includes a channel state information-reference signal (CSI-RS) for the second TRP.

16. The base station of claim 13, wherein the controller is configured to control to transmit at least one of connection grant information, timing advance (TA) information or random access channel (RACH) request information from the second TRP.

* * * * *